(12) United States Patent
Yamamoto

(10) Patent No.: US 9,189,748 B2
(45) Date of Patent: Nov. 17, 2015

(54) INFORMATION EXTRACTION SYSTEM, METHOD, AND PROGRAM

(75) Inventor: Kosuke Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 324 days.

(21) Appl. No.: 13/699,566

(22) PCT Filed: Apr. 28, 2011

(86) PCT No.: PCT/JP2011/002497
§ 371 (c)(1),
(2), (4) Date: Jan. 23, 2013

(87) PCT Pub. No.: WO2011/148571
PCT Pub. Date: Dec. 1, 2011

(65) Prior Publication Data
US 2013/0124439 A1    May 16, 2013

(30) Foreign Application Priority Data

May 24, 2010    (JP) .................................. 2010-118450

(51) Int. Cl.
*G06N 5/02*    (2006.01)
*G06N 99/00*    (2010.01)
*G06F 17/27*    (2006.01)

(52) U.S. Cl.
CPC ............ *G06N 99/005* (2013.01); *G06F 17/278* (2013.01); *G06F 17/2785* (2013.01); *G06N 5/02* (2013.01)

(58) Field of Classification Search
CPC .... G06F 17/20–17/289; G06K 9/6256–9/6259
See application file for complete search history.

(56) References Cited

U.S. PATENT DOCUMENTS 6,684,202 B1 *   1/2004   Humphrey et al. ............. 706/45
2003/0212544 A1 *  11/2003   Acero et al. .................... 704/9
(Continued)

FOREIGN PATENT DOCUMENTS

JP    2005-031785    2/2005
JP    2006-023968    1/2006
(Continued)

OTHER PUBLICATIONS

Sugimoto, Futoshi et al.; "A Method to Classify Emotional Expressions of Text and Synthesize Speech"; 2004; Department of Information and Computer Sciences, Toyo University; pp. 611-614.*
(Continued)

*Primary Examiner* — Stanley K Hill
(74) *Attorney, Agent, or Firm* — Scully, Scott, Murphy & Presser, P.C.

(57) ABSTRACT

A system, method and program are provided. For example, a method includes acquiring sentence sets, respectively matching a positive or negative example solution request pattern which represents a positive or negative example of a sentence including a problem evoking expression, the negative example being an opposite request to the positive example, from a corpus respectively as a positive and negative example solution request sentence sets, extracting, respectively, the problem evoking expression from a sentence in the positive example solution request sentence set, and a sentence in the negative example solution request sentence set. The method further includes comparing, for each problem evoking expression, constituent elements of sentences included in the positive and negative example solution request sentence sets, and specifying respective constituent elements characterizing the positive or negative example solution request sentence set respectively as positive or negative example identification information.

10 Claims, 14 Drawing Sheets

(56) References Cited

U.S. PATENT DOCUMENTS

| | | | |
|---|---|---|---|
| 2006/0074634 A1* | 4/2006 | Gao et al. | 704/9 |
| 2008/0097758 A1* | 4/2008 | Li et al. | 704/240 |
| 2011/0167027 A1* | 7/2011 | Tsuchida et al. | 706/12 |

FOREIGN PATENT DOCUMENTS

| | | |
|---|---|---|
| JP | 2006-031198 | 2/2006 |
| JP | 2006-251975 | 9/2006 |
| JP | 2007-102309 | 4/2007 |
| JP | 2009-163303 | 7/2009 |

OTHER PUBLICATIONS

Alm Cecilia Ovesdotter et al.; "Emotions from text: machine learning for text-based emotion prediction"; 2005; Association for computational Linguistics; Proceedings of Human Language Technology Conference and Conference on Empirical Methods in Natural Language Processing; pp. 579-586.*

Dave, Kushal et al.; "Mining the Peanut Gallery: Opinion Extraction and Semantic Classification of Product Reviews"; 2003; ACM; pp. 519-528.*

Kawahara, Daisuke et al., "Gradual Fertilization of Case Frames", Journal of Natural Language Processing (Mar. 31, 2005), vol. 12, No. 2, pp. 109-131.

Suzuyama, Koji et al., "Call Center DB Building/Searching and Their Application to a Support System for Composing the Answers to Questions", IPSJ SIG Notes (Mar. 28, 2007), vol. 2007, No. 35, pp. 29-34.

Tsuchida, Masaaki et al., "Learning Method of Named Entity Recognizer using Dictionary and Untagged Corpus", The 23rd Annual Conference of the Japanese Society for Artificial Intelligence, 2009, pp. 1-4.

International Search Report dated Jun. 21, 2011 issued in PCT/JP2011/002497.

English-language translation of the International Preliminary Report on Patentability and Written Opinion, dated Jun. 21, 2011 from related International Application No. PCT/JP2001/002497.

* cited by examiner

FIG. 3

(a) 201:PATTERN TYPE TABLE

| PATTERN TYPE ID | EXPRESSION STRUCTURE |
|---|---|
| 1 | $x$ ("ga") $y$ |
| 2 | $x$ ("wo") $y$ |
| : | : |

(b) 202:PATTERN TABLE

| PATTERN TYPE ID | PATTERN |
|---|---|
| 1 | as $x$ not to $y$, |
| 1 | as $x$ not to $y$. |
| 1 | as $x$ has not to $y$, |
| 1 | as $x$ has not to $y$. |
| 2 | not make $x$ $y$, |
| 2 | not make $x$ $y$. |
| : | : |

FIG. 4

(a) 201:PATTERN TYPE TABLE

| PATTERN TYPE ID | EXPRESSION STRUCTURE |
|---|---|
| 1 | $x$ ("ga") $y$ |
| 2 | $x$ ("wo") $y$ |
| : | : |

(b) 203:PATTERN TABLE

| PATTERN TYPE ID | PATTERN |
|---|---|
| 1 | as $x$ not to $y$, |
| 1 | as $x$ not to $y$. |
| 2 | as $x$ has not to $y$, |
| 2 | as $x$ has not to $y$. |
| : | : |

FIG. 7

| FLAG | PATTERN | $x$ | $y$ |
|---|---|---|---|
| N | FOR YOU WHO WANT COLOR TO BLEED IN PAINT... | COLOR | BLEED |
| P | I WANT PAPER NOT TO BE JAMMED IN PRINTER... | PAPER | JAMMED |
| P | TO PREVENT PAPER FROM BEING JAMMED... | PAPER | JAMMED |
| N | METHOD FOR MAKING COLOR BLEED BY PAINTING TOOL... | COLOR | BLEED |
| P | WANT COLOR OF INK NOT TO BLEED | COLOR | BLEED |
| P | PROPERLY SELECT INK SO THAT COLOR DOES NOT BLEED | COLOR | BLEED |
| : | : | : | : |

FIG. 8

204: PROBLEM EVOKING EXPRESSION DATA (a)
| EXPRESSION ID | PATTERN TYPE ID | $x$ | $y$ | PROBLEM EVOKING EXPRESSION |
|---|---|---|---|---|
| 1 | 1 | COLOR @ NOUN | BLEED @ VERB | COLOR BLEEDS |
| 2 | 1 | PAPER @ NOUN | BLEED @ VERB | PAPER IS JAMMED |

205: POSITIVE EXAMPLE SOLUTION REQUEST SENTENCE SET (b)
| EXPRESSION ID | RELEVANT SENTENCE |
|---|---|
| 1 | WANT COLOR OF INK NOT TO BLEED |
| 1 | PROPERLY SELECT INK SO THAT COLOR DOES NOT BLEED |
| : | : |
| 2 | I WANT PAPER NOT TO BE JAMMED IN PRINTER... |
| 2 | TO PREVENT PAPER FROM BEING JAMMED... |
| : | : |

206: NEGATIVE EXAMPLE SOLUTION REQUEST SENTENCE SET (c)
| EXPRESSION ID | RELEVANT SENTENCE |
|---|---|
| 1 | FOR YOU WHO WANT COLOR TO BLEED IN PAINT... |
| 1 | METHOD FOR MAKING COLOR BLEED BY PAINTING TOOL... |
| : | : |

| POSITIVE EXAMPLE ELEMENT VECTOR | PATTERN, ADJACENT, MASKING, PASTE, DYEING, CLOTH, FIRE, PRINT, DESIGN, CAUTION, ONE DAY, DATE, BACKGROUND, COLORING, PAINT |
|---|---|
| NEGATIVE EXAMPLE ELEMENT VECTOR | LINE DRAWING PART, BACKGROUND, BACKSIDE, PINK, FLOATING, UNDER WATER, PAINT, MOUNTAINS, YOUNG BUD, PHENOMENON, SPIRIT, SCENE, COLORING, LAYER |

FIG. 11

204: PROBLEM EVOKING EXPRESSION DATA (a)

| EXPRESSION ID | PATTERN TYPE ID | $x$ | $y$ | PROBLEM EVOKING EXPRESSION |
|---|---|---|---|---|
| 1 | 1 | COLOR @ NOUN | BLEED @ VERB | COLOR BLEEDS |
| 2 | 1 | PAPER @ NOUN | BLEED @ VERB | PAPER IS JAMMED |

207: POSITIVE EXAMPLE IDENTIFICATION INFORMATION (b)

| EXPRESSION ID | POSITIVE EXAMPLE IDENTIFICATION INFORMATION |
|---|---|
| 1 | PATTERN, MASKING, PASTE, DYEING, CLOTH, FIRE, PRINT, DESIGN |
| : | : |

208: NEGATIVE EXAMPLE IDENTIFICATION INFORMATION (c)

| EXPRESSION ID | NEGATIVE EXAMPLE IDENTIFICATION INFORMATION |
|---|---|
| 1 | LINE DRAWING PART, FLOATING, UNDER WATER, MOUNTAINS, YOUNG BUD, SPIRIT, SCENE, LAYER |
| : | : |

FIG. 14

204: PROBLEM EVOKING EXPRESSION DATA (a)

| EXPRESSION ID | PATTERN TYPE ID | $x$ | $y$ | PROBLEM EVOKING EXPRESSION |
|---|---|---|---|---|
| 1 | 1 | COLOR @ NOUN | BLEED @ VERB | COLOR BLEEDS |
| 2 | 1 | PAPER @ NOUN | BLEED @ VERB | PAPER IS JAMMED |

209: TRAINING DATA (b)

| EXPRESSION ID | SENTENCE | FLAG |
|---|---|---|
| 1 | HAVE TROUBLE AS COLOR BLEEDS ON PRINTER | P |
| 1 | PRINTER SEEMS NOT WORKING AND, WHEN USED, COLOR BLEEDS AND CHARACTERS ARE... | P |
| 1 | THOUGH COLOR BLED, IT WAS LEFT THAT WAY | N |
| 1 | WHEN USING BLURRING FUNCTION, COLOR BLED TO HAVE BEAUTIFUL EFFECT | N |
| 1 | STATE OF SKY COLOR BLEEDING IS FANTASTIC | |
| .. | | |

INFORMATION EXTRACTION SYSTEM, METHOD, AND PROGRAM

TECHNICAL FIELD

The present invention relates to an information extraction system, an information extraction method, and an information extraction program for performing information extraction.

BACKGROUND ART

There is a technique of extracting a specific type of information using a large corpus (set of example sentences). The specific type of information may be any of various information such as named entities and evaluative expressions. In the following description, it is assumed that data (hereafter simply referred to as "expression") indicating an expression which evokes a problem is to be extracted.

Extracting a specific type of information is equivalent to identifying whether data belongs to the specific type (positive example) or does not belong to the specific type (negative example). In machine learning, there is normally a need to prepare certain amounts of positive examples and negative examples as training data beforehand, in order to create rules for identification. This requires a high-cost human work.

Non Patent Literature (NPL) 1 describes a creation method for named entity extraction aimed at reducing the training data preparation cost in named entity extraction and, as means for this, a technique of identifying positive examples/negative examples of training data.

In the method described in NPL 1, training data candidates for positive examples/negative examples are created from a corpus using dictionary data (hereafter simply referred to as "dictionary"). The dictionary records pairs of words and classes. A class indicates what kind of proper noun, such as a personal name, an organization name, a place name, or the like, a word belongs to. A training data candidate is created by assigning a class to a word that matches the dictionary. Even when the word matches the dictionary, however, a correct class is not necessarily assigned to the word. That is, the training data candidates include "false data" to which a false class is assigned.

In the method described in NPL 1, the following process is carried out. Clustering is performed on the training data candidates including the false data so that data belonging to the same class are included in the same cluster as much as possible, through the use of surrounding words. Using, as identification information, the presence of a specific class locally included in a cluster as a majority in the clustering, data of the locally-included specific class is determined as a positive example.

Patent Literature (PTL) 1 describes a method of searching a set of search target documents for a set of extraction target documents by an initial search expression, and for a definite positive example which is a set of documents matching a search purpose and a definite negative example which is a set of documents not matching the search purpose.

CITATION LIST

Patent Literature

PTL 1: Japanese Patent Application Laid-Open No 2009-163303

Non Patent Literature

NPL 1: Masaaki Tsuchida, Hironori Mizuguchi, Dai Kusui, and Hayato Ohwada "Learning Method of Named Entity Recognizer using Dictionary and Untagged Corpus", The 23rd Annual Conference of the Japanese Society for Artificial Intelligence, 2009

SUMMARY OF INVENTION

Technical Problem

The method described in NPL 1 is based on a precondition that a class assigned to a word superficially matching a character string registered in the dictionary is substantially correct. In the case where many words are assigned false classes, in subsequent clustering, words forming a majority in a cluster are a set of words with a false class. Thus, in the case where the above-mentioned precondition is not satisfied, the identification information of determining the class which is the majority in the cluster is not suitable for identification of positive examples and negative examples.

In some of expressions evoking problematic situations (hereafter also referred to as "problem evoking expressions"), whether a problem actually occurs (positive example) or not (negative example) depends on context or background knowledge. Accordingly, even when a dictionary of expressions evoking problems is prepared, a character string that superficially matches the dictionary does not necessarily serve as a positive example. With the superficial matching alone, there is still a high possibility that many words are negative examples. Hence, the method described in NPL 1 is not suitable for extraction of the above-mentioned expressions.

In the method described in PTL 1, document data matching the search purpose is treated as a positive example, and document data not matching the search purpose is treated as a negative example. For instance, a sentence including a keyword in search is a positive example, and a sentence not including the keyword is a negative example. Thus, the method described in PTL 1 uses a single search purpose. Though this is useful for finding a condition that matches a request, a possibility that the condition also matches a request opposite to the foregoing request cannot be eliminated.

In view of this, the present invention has an exemplary object of providing an information extraction system, an information extraction method, and an information extraction program for extracting identification information for identifying positive examples/negative examples for an expression which has a superficial match or similarity but which varies in whether or not the expression actually represents a problem depending on context or background knowledge, in order to extract an expression evoking a problematic situation.

Solution to Problem

An information extraction system according to the present invention is an information extraction system for extracting identification information for identifying a problem evoking expression which is an expression evoking a problematic situation, the information extraction system including: solution request sentence set acquisition means for acquiring, using a positive example solution request pattern representing a positive example of a sentence including the problem evoking expression and a negative example solution request pattern representing an opposite request to the positive example solution request, a sentence set matching the positive example solution request pattern and a sentence set matching the negative example solution request pattern from a corpus respectively as a positive example solution request sentence set and a negative example solution request sentence set, and storing parts, in the acquired positive example solution request sentence set and negative example solution request sentence set, that correspond to the problem evoking expression in the positive example solution request pattern and the negative example solution request pattern, in association with a positive example and a negative example; and identification information specification means for comparing, for each problem evoking expression, constituent elements of sentences included in the positive example solution request sentence set and the negative example solution request sentence set, and specifying a constituent element characterizing the positive example solution request sentence set and a constituent element characterizing the negative example solution request sentence set, respectively as positive example identification information for identifying a positive example of a sentence including the problem evoking expression and negative example identification information for identifying a negative example of a sentence including the problem evoking expression.

An information extraction method according to the present invention is an information extraction method for extracting identification information for identifying a problem evoking expression which is an expression evoking a problematic situation, the information extraction method including: acquiring, using a positive example solution request pattern representing a positive example of a sentence including the problem evoking expression and a negative example solution request pattern representing an opposite request to the positive example solution request, a sentence set matching the positive example solution request pattern and a sentence set matching the negative example solution request pattern from a corpus respectively as a positive example solution request sentence set and a negative example solution request sentence set, and storing parts, in the acquired positive example solution request sentence set and negative example solution request sentence set, that correspond to the problem evoking expression in the positive example solution request pattern and the negative example solution request pattern, in association with a positive example and a negative example; and comparing, for each problem evoking expression, constituent elements of sentences included in the positive example solution request sentence set and the negative example solution request sentence set, and specifying a constituent element characterizing the positive example solution request sentence set and a constituent element characterizing the negative example solution request sentence set, respectively as positive example identification information for identifying a positive example of a sentence including the problem evoking expression and negative example identification information for identifying a negative example of a sentence including the problem evoking expression.

An information extraction program according to the present invention causes a computer to execute: a solution request sentence set acquisition process of acquiring, using a positive example solution request pattern representing a positive example of a sentence including the problem evoking expression and a negative example solution request pattern representing an opposite request to the positive example solution request, a sentence set matching the positive example solution request pattern and a sentence set matching the negative example solution request pattern from a corpus respectively as a positive example solution request sentence set and a negative example solution request sentence set, and storing parts, in the acquired positive example solution request sentence set and negative example solution request sentence set, that correspond to the problem evoking expression in the positive example solution request pattern and the negative example solution request pattern, in association with a positive example and a negative example; and an identification information specification process of comparing, for each problem evoking expression, constituent elements of sentences included in the positive example solution request sentence set and the negative example solution request sentence set, and specifying a constituent element characterizing the positive example solution request sentence set and a constituent element characterizing the negative example solution request sentence set, respectively as positive example identification information for identifying a positive example of a sentence including the problem evoking expression and negative example identification information for identifying a negative example of a sentence including the problem evoking expression.

Advantageous Effects of Invention

According to the present invention, it is possible to extract identification information for identifying positive examples/negative examples for an expression which has a superficial match or similarity but which varies in whether or not the expression actually represents a problem depending on context or background knowledge, in order to extract an expression evoking a problematic situation.

BRIEF DESCRIPTION OF DRAWINGS

FIG. 3 It depicts an explanatory diagram showing an example of a data storage format of a positive example solution request pattern storage unit 30.

FIG. 4 It depicts an explanatory diagram showing an example of a data storage format of a negative example solution request pattern storage unit 35.

FIG. 7 It depicts an explanatory diagram showing an example of a storage format of intermediate data stored by the solution request sentence set acquisition unit 101.

FIG. 8 It depicts an explanatory diagram showing an example of a format of an output result output by the solution request sentence set acquisition unit 101.

FIG. 11 It depicts an explanatory diagram showing an example of positive example identification information and negative example identification information specified by the identification information specification unit 102.

FIG. 14 It depicts an explanatory diagram showing an example of a storage format of training data output by the training data extraction unit 104.

DESCRIPTION OF EMBODIMENTS

Figure 1:
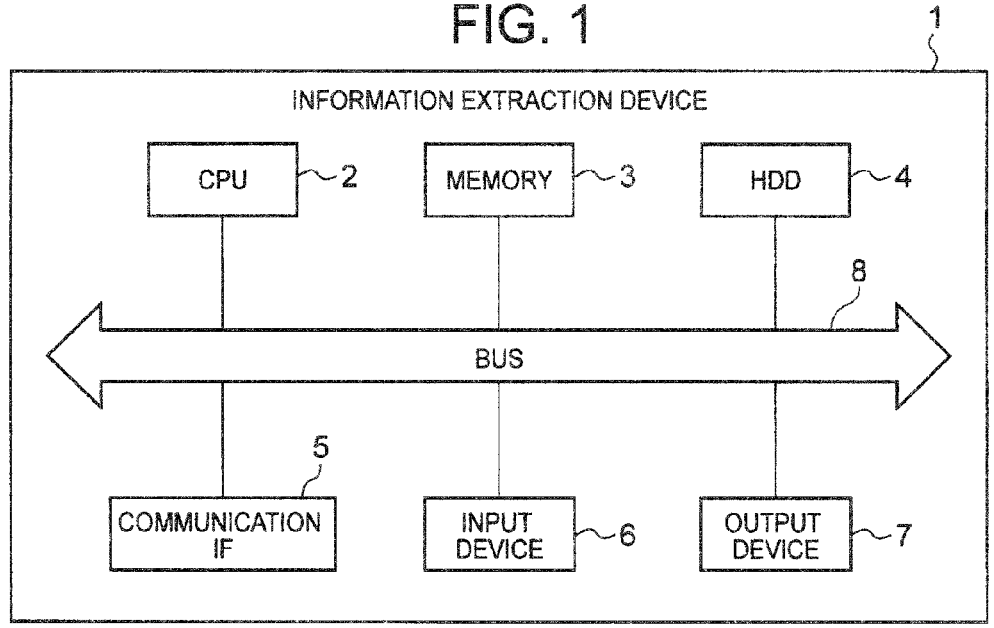
FIG. 1 It depicts a hardware structure diagram showing a structure example of Exemplary Embodiment 1 of an information extraction device according to the present invention.

The background and overview of the present invention are described below, to facilitate understanding of the present invention. It is assumed here that, in the case where an expression "iro ga nijimu" (color bleeds) is a problem evoking expression, identification information for identifying whether or not the expression actually represents a problem is presented. The presentation of the identification information mentioned here is to present surrounding words in the case where the expression represents a problem and in the case where the expression does not represent a problem.

Sentence 1: "purinto shitara iro ga nijinda" (color bled when printing).

Sentence 2: "sora no iro ga nijinda" (sky color bled).

The sentences 1 and 2 include the problem evoking expression "iro ga nijimu" (color bleeds). Regarding the sentence 1 alone, the sentence 1 states that the color of letters or illustrations bleeds on the printer, and so actually represents a problem. On the other hand, the sentence 2 represents a beautiful state where the landscape of the sky bleeds due to factors such as clouds or a sunset. That is, the expression "iro ga nijimu" (color bleeds), even though superficially the same, varies in whether it is problematic (positive example) or favorable (negative example) depending on context or background knowledge.

For such an expression, in addition to the problem evoking expression, information for identifying whether it is problematic (positive example) or not (negative example) is necessary. In view of this, the present invention presents a set of surrounding words with which the problem evoking expression tends to be a positive example/negative example, as identification information. In the method described in NPL 1, since clustering is performed so that the sentences 1 and 2 belong to one cluster, information for clearly identifying them is not obtained.

The present invention is based on a precondition that "if problematic, a sentence requesting a solution (solution request sentence) is included in a corpus". This precondition is described below, using an example. For instance, if there is a person who does not want color bleeding, it is expected that sentence data (hereafter simply referred to as "sentence") describing a request "iro ga nijimanai you ni shitai" (want color not to bleed) is more or less present in the corpus. The presence of such a sentence is the precondition. When the number of sentences is larger, there is a higher possibility that the precondition is satisfied. Hence, it is deemed that the precondition is normally satisfied in the case of using a large corpus.

The use of the above-mentioned solution request sentence enables the problem evoking expression to be extracted. For instance, if a sentence matching the solution request sentence "iro ga nijimanai you ni shitai" (want color not to bleed) is present in the corpus, "iro ga nijimu" (color bleeds) represents a problem. As mentioned earlier, however, there is also a situation where color bleeding is favorable. Accordingly, in the present invention, the presence or absence of a sentence matching a solution request sentence of an opposite polarity "iro ga nijimu you ni shitai" (want color to bleed) is checked, too. If the matching sentence is present in the corpus, "iro ga nijimu" (color bleeds) is not necessarily a problem evoking expression.

In the present invention, word data (hereafter simply referred to as "word") locally occurring in only one of respective sentence set data (hereafter simply referred to as "sentence set") obtained based on these two solution request sentences is extracted. For instance, suppose "purinta" (printer), "insatsu" (print), and the like are obtained as words locally present in a sentence set matching the solution request sentence "iro ga nijimanai you ni shitai" (want color not to bleed), whereas "keshiki" (scenery), "paretto" (palette), and the like are words locally present in a sentence set matching the solution request sentence "iro ga nijimu you ni shitai" (want color to bleed). Such information serves as a criterion for identifying whether or not the expression "iro ga nijimu" (color bleeds) is a problem evoking expression. Therefore, in the present invention, in addition to the expression "iro ga nijimu" (color bleeds), a set of words that are surrounding words with which the expression can be regarded as a positive example and a set of words that are surrounding words with which the expression can be regarded as a negative example are output as identification information.

The following describes exemplary embodiments of the present invention.

Exemplary Embodiment 1

FIG. 1 is a hardware structure diagram showing a structure example of Exemplary Embodiment 1 of an information extraction device according to the present invention. As shown in FIG. 1, an information extraction device 1 includes a CPU 2, a memory 3, a hard disk drive (HUD) 4, a communication interface (IF) 5, an input device 6, and an output device 7. These components are connected to each other via a bus 8, and are capable of data input/output.

The information extraction device 1 is typically realized by an information processing device such as a personal computer operating according to a program. The communication IF 5 is an interface for connecting to an external network. The input device 6 is realized by, for instance, a keyboard and a mouse. The output device 7 is realized by, for instance, a display device such as a display or the like.

Each process in this exemplary embodiment is typically realized by the CPU 2 operating according to a program stored in the memory 3 or the HDD 4. The above-mentioned components included in the information extraction device 1 may be included in the same enclosure as shown in FIG. 1, or in different enclosures.

Figure 2:
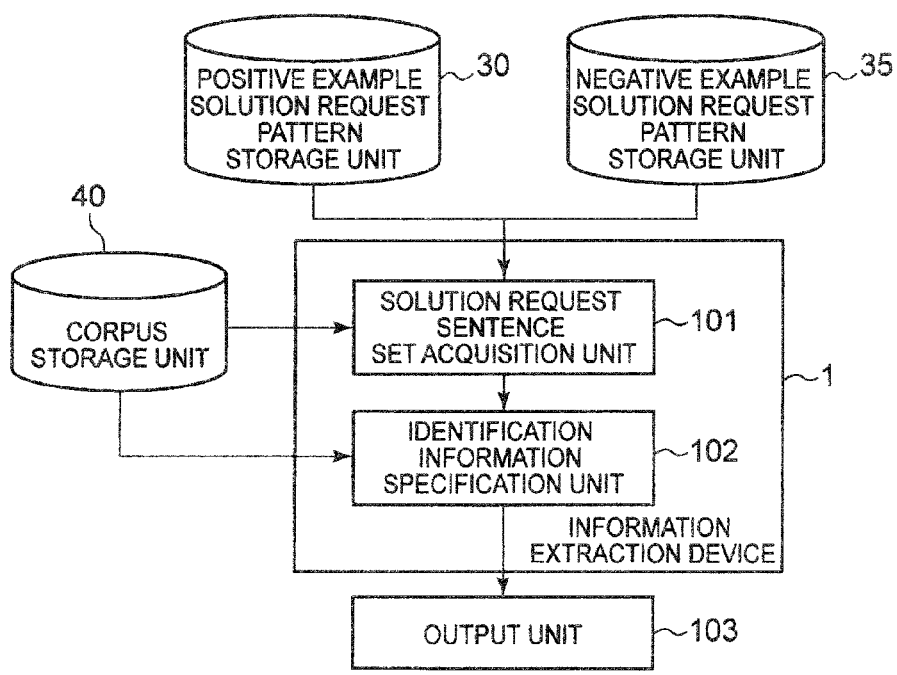
FIG. 2 It depicts a functional block diagram showing an example of a functional structure of an information extraction system using an information extraction device 1.

FIG. 2 is a block diagram showing an example of a functional structure of an information extraction system using the information extraction device 1. As shown in FIG. 2, the information extraction device 1 includes a solution request sentence set acquisition unit 101 and an identification information specification unit 102. The information extraction system includes the information extraction device 1, a positive example solution request pattern storage unit 30, a negative example solution request pattern storage unit 35, a corpus storage unit 40, and an output unit 103.

The solution request sentence set acquisition unit 101 in the information extraction device 1 is typically realized by the CPU 2 operating according to a program. The solution request sentence set acquisition unit 101 has a function of determining a sentence set matching a positive example solution request pattern for extracting a positive example stored in the positive example solution request pattern storage unit 30. The solution request sentence set acquisition unit 101 also has a function of acquiring the sentence set determined as a match, from the corpus storage unit 40 as a positive example solution request sentence set (i.e. extracting the sentence set from the corpus storage unit 40). The solution request sentence set acquisition unit 101 further has a function of acquiring a sentence set matching a negative example solution request pattern for extracting a negative example stored in the negative example solution request pattern storage unit 35, from the corpus storage unit 40 as a negative example solution request sentence set. The solution request sentence set acquisition unit 101 acquires the sentence sets using any of various methods depending on the mode of the corpus storage unit 40 described later.

Through the use of each pattern, the solution request sentence set acquisition unit 101 can designate, as an arbitrary character string, a part that is a problem evoking expression, and thus extract the problem evoking expression with high precision. For instance, the solution request sentence set acquisition unit 101 uses pattern matching including wildcards in regular expressions, for the acquisition of the positive example solution request sentence set and the negative example solution request sentence set.

The solution request sentence set acquisition unit 101 extracts, in each sentence of the positive example solution request sentence set and the negative example solution request sentence set, a character string from a part designated as an arbitrary character string in the pattern, and sets the character string as a problem evoking expression. For each problem evoking expression candidate, the solution request sentence set acquisition unit 101 organizes the positive example solution request sentence set and the negative example solution request sentence set.

The positive example solution request pattern storage unit 30 stores, in the case where the problem evoking expression is an affirmative sentence, the positive example solution request pattern indicating the desire to solve the problem. The negative example solution request pattern storage unit 35 stores the negative example solution request pattern reversed in polarity from the positive example solution request pattern. The positive example solution request pattern storage unit 30 and the negative example solution request pattern 35 are realized by, for instance, a storage device such as the memory 3, the HDD 4, or the like.

The corpus storage unit 40 is typically realized by a storage device such as an optical disk device, a magnetic disk device, or the like. The corpus storage unit 40 stores a large corpus (set of example sentences). As the data stored in the corpus storage unit 40, arbitrary information such as Web information, a document database of an organization, and the like may be used so long as they are arbitrary large document data. For instance, in the case where the corpus storage unit 40 is located outside the organization and the stored information are published on the Web, the solution request sentence set acquisition unit 101 accesses the information via the Internet or the like.

For instance, the solution request sentence set acquisition unit 101 extracts the positive example solution request sentence set and the negative example solution request sentence set from the corpus storage unit 40, through the use of a search engine. The solution request sentence set acquisition unit 101 associates the extracted positive example solution request sentence set and negative example solution request sentence set with the problem evoking expression, and outputs them to the identification information specification unit 102.

The identification information specification unit 102 has a function of performing morphological analysis on the sentences included in the positive example solution request sentence set and the negative example solution request sentence set, and extracting words in the sentences including the problem evoking expression.

The identification information specification unit 102 also has a function of comparing, from among the extracted words, words of a predetermined word class between the positive example solution request sentence set and the negative example solution request sentence set, and creating a word vector that puts importance on words which tend to occur not in both sets commonly but only in one of the sets. Here, a vector of words which tend to occur only in the positive example solution request sentence set is referred to as positive example identification information, and a vector of words which tend to occur only in the negative example solution request sentence set is referred to as negative example identification information. The identification information specification unit 102 associates the positive example identification information and the negative example identification information with the problem evoking expression, and outputs them to the output unit 103.

The output unit 103 has a function of presenting the output result of the information extraction device 1. For instance, the output unit 103 performs control so that the output result of the information extraction device 1 is displayed on a display unit. The output unit 103 is realized by, for instance, the output device 7.

The following describes the components of the information extraction device 1 in detail. FIG. 3 shows an example of patterns stored in the positive example solution request pattern storage unit 30. In the example of FIG. 3, the positive example solution request pattern storage unit 30 uses two tables that are a pattern type table 201 and a pattern table 202, to store positive example solution request patterns.

FIG. 4 shows an example of patterns stored in the negative example solution request pattern storage unit 35. In the example of FIG. 4, the negative example solution request pattern storage unit 35 uses two tables that are the pattern type table 201 and a pattern table 203, to store negative example solution request patterns indicating opposite requests.

The pattern type table 201 in FIG. 3(*a*) and FIG. 4(*a*) has two fields for respectively recording a pattern type ID and an expression structure, per row (record). The pattern type ID field stores an identifier assigned to each syntax of an expression regarded as a problem evoking expression. The expression structure field stores a structure of a sentence regarded as a problem evoking expression. The meanings of $x$ and $y$ stored will be described later.

The pattern table 202 in FIG. 3(*b*) and the pattern table 203 in FIG. 4(*b*) each have two fields for a pattern type ID and a pattern. The pattern field stores a character string used as a template for finding a solution request sentence.

In the examples shown in FIGS. 3 and 4, the expression structure field in the pattern type table 201 stores an expression structure representing a binary relation of each of "ga" case and "wo" case. $x$ and $y$ stored in the expression structure field each represent an arbitrary character string, and respectively correspond to $x$ and $y$ in the pattern field in the pattern table 202.

The pattern table 202 in FIG. 3(b) includes four records with the pattern type ID "1". In these four patterns, $x$ and $y$ each represent an arbitrary character string with a constraint of a word class. The constraint can be set in, for instance, a configuration file used by the solution request sentence set acquisition unit 101 described later.

The part corresponding to the arbitrary character string is regarded as a provisional problem evoking expression in subsequent processing. Accordingly, as each pattern stored in the pattern table 202 in FIG. 3, a pattern that indicates a solution request without fail and enables an expression corresponding to a problem evoking expression to be correctly extracted is used, More complex conditions may be described in a positive example solution request pattern and a negative example solution request pattern. For instance, a condition described as "$x$ wo $y$ you ni @ verb" forms a pattern representing that a verb follows "you ni".

The pattern table 203 in FIG. 4(b) is the same as the pattern table 202 in FIG. 3(b), but stores patterns indicating opposite requests from the solution request patterns stored in the pattern table 202 in FIG. 3(b). Here, pattern type IDs are set so as to ensure the correspondence between FIGS. 3 and 4. For instance, a positive example solution request pattern whose pattern type ID is "1" in FIG. 3 corresponds to a negative example solution request pattern whose pattern type ID is "1" in FIG. 4.

The data stored in the positive example solution request pattern storage unit 30 and the negative example solution request pattern storage unit 35 may be manually created by the user or the like beforehand. The storage method of these data is not limited to the tabular format, so long as the same data can be handled. For instance, these data may be described in a format of XML or the like.

In this exemplary embodiment, the pattern storage unit is located outside the information extraction device 1 as the positive example solution request pattern storage unit 30 and the negative example solution request pattern storage unit 35, in order to ease rewriting of patterns by the user or the like. However, the pattern storage unit need not necessarily be in such a form. For instance, the same information may be described as a configuration file used by the solution request sentence set acquisition unit 101, and read by the solution request sentence set acquisition unit 101 upon startup. Alternatively, the same information may be hard-coded to a program for operating the solution request sentence set acquisition unit 101.

Moreover, a plurality of expression structures need not necessarily be stored as shown in FIG. 3. For instance, in the case where only the binary relation of "ga" case "$x$ ga $y$" is subject to the problem evoking expression, the pattern type ID field in the pattern type table 201, the pattern table 202 for positive example solution request, and the pattern table 203 for negative example solution request is unnecessary.

In the example of "ga" case "$x$ ga $y$", the problem evoking expression is defined by two arbitrary character strings. In this exemplary embodiment, however, the number of arbitrary character strings is not limited to two, and the positive example solution request pattern and the negative example solution request pattern may be in any form including at least one arbitrary character string.

Hereafter, in this exemplary embodiment, processing is described using an example where the positive example solution request pattern and the negative example solution request pattern each include two arbitrary character strings, based on an assumption that the identification information of the problem evoking expression represented by "ga" case "$x$ ga $y$" is specified. Accordingly, the pattern type ID field stores a single value, and is not used for processing. In the case where a plurality of values are stored in the pattern type ID field, on the other hand, the identification information extraction process is executed for each of the plurality of values.

In this exemplary embodiment, the positive example solution request pattern and the negative example solution request pattern are stored in separate storage units. However, the positive example solution request pattern and the negative example solution request pattern may be stored in the same storage unit. In such a case, the positive example solution request pattern and the negative example solution request pattern may be stored in association with, for instance, IDs for identification.

Figure 5:
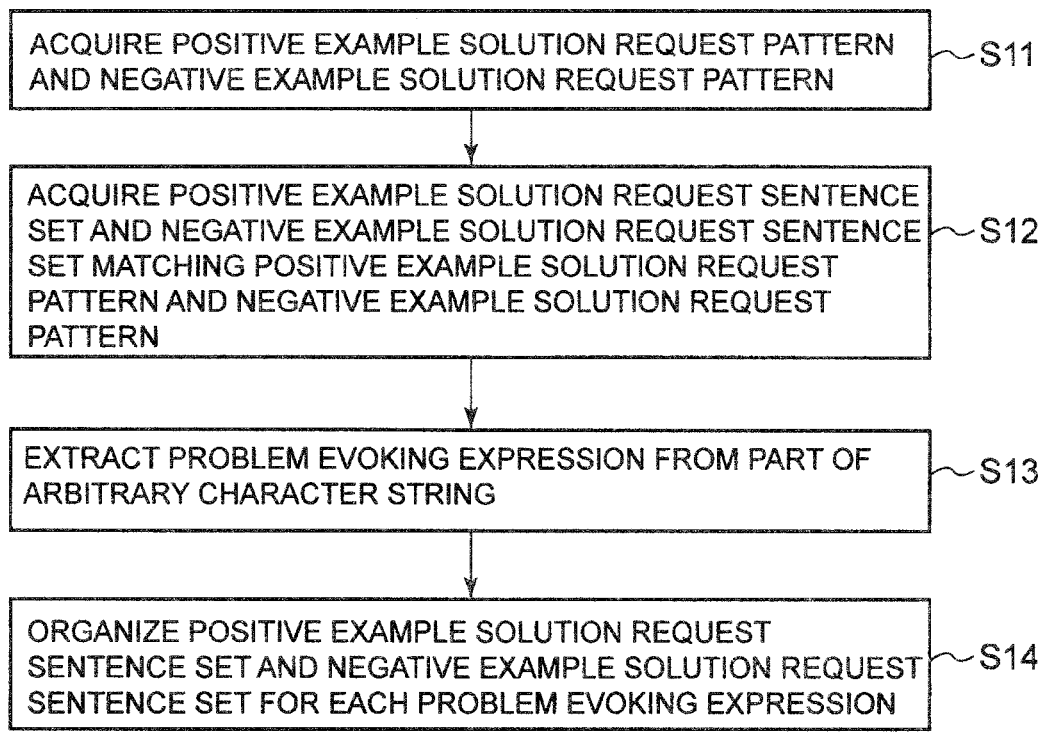
FIG. 5 It depicts a flowchart showing an operation example of a solution request sentence set acquisition unit 101.

The following describes the operation executed by the information extraction device, with reference to drawings. FIG. 5 is a flowchart showing an operation example of the solution request sentence set acquisition unit 101.

To extract the problem evoking expression and the identification information from the sentence set, the user performs a solution request pattern registration operation using the input device 6. The solution request sentence set acquisition unit 101 acquires the solution request patterns from the positive example solution request pattern storage unit 30 and the negative example solution request pattern storage unit 35, according to the operation by the user (step S11). In detail, the solution request sentence set acquisition unit 101 references to the pattern table 202 for positive example solution request and the pattern table 203 for negative example solution request, and reads the patterns stored in the pattern fields. This corresponds to the process of step S11 in FIG. 5.

Next, the solution request sentence set acquisition unit 101 performs pattern matching on the sentences stored in the corpus storage unit 40 using the read patterns, and acquires matching sentences. Here, the set of sentences matching the positive example solution request pattern is set as the positive example solution request sentence set, and the set of sentences matching the negative example solution request pattern is set as the negative example solution request sentence set. This corresponds to the process of step S12 in FIG. 5.

The solution request sentence set acquisition unit 101 performs pattern matching using, for instance, wildcards in regular expressions. This is a function supported in typical programming languages such as Java (registered trademark) and Ruby (registered trademark). Since phrase search including a wildcard "*" can also be performed in a search engine such as Google (registered trademark), an API of such a search engine may be used.

$x$ and $y$ included in each pattern represent arbitrary character strings constrained by word classes or the like. The solution request sentence set acquisition unit 101 stores the extracted sentence sets in the memory 3 or the like as temporarily stored data, in association with identification flags to indicate, for each sentence, whether the sentence is extracted by the positive example solution request pattern or the negative example solution request pattern.

Next, the solution request sentence set acquisition unit 101 determines, for each sentence in the positive example solution request sentence set and the negative example solution request sentence set, whether or not character strings corresponding to $x$ and $y$ in the positive example solution request pattern or the negative example solution request pattern satisfy constraints. The solution request sentence set acquisition unit 101 extracts each sentence determined to satisfy the constraints.

Regarding each sentence determined not to satisfy the constraints, the solution request sentence set acquisition unit 101 excludes the sentence from the positive example solution request sentence set and the negative example solution request sentence set. This corresponds to the process of step S13 in FIG. 5.

Figure 6:
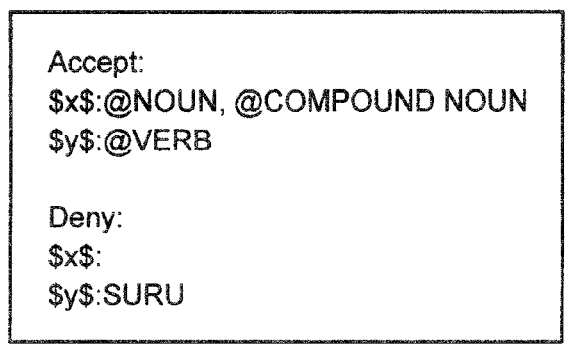
FIG. 6 It depicts an explanatory diagram showing an example of a configuration file for imposing constraints on arbitrary words included in a positive example solution request pattern and a negative example solution request pattern.

FIG. 6 shows an example of a configuration file for designating constraints. In the example shown in FIG. 6, two states that are "Accept" and "Deny" are designated for $x$ and $y$. "Accept" represents constraints of constituent elements permitted as $x$ and $y$. "Deny" represents constituent elements not permitted as $x$ and $y$. Note that constituent elements mean words, word classes, and relations constituting a sentence.

In the example shown in FIG. 6, characters starting with @ represent a word class constraint. Based on this, the solution request sentence set acquisition unit 101 determines whether or not $x$ is intended as a noun or a compound noun. Meanwhile, a "character string without @" represents a character string itself, and limits a character string located at the position of $x$ or $y$. Since verbs, adjectives, adjective verbs, and the like have conjugation, the solution request sentence set acquisition unit 101 performs character string comparison with $x$ or $y$ using the dictionary form of the word.

A "character string without @" described in "Accept" means that the sentence is not to be extracted unless the character string is included. Meanwhile, a "character string without @" described in "Deny" serves as a stop word.

For instance, consider the case where the solution request sentence set acquisition unit 101 extracts, from the corpus, an expression whose part corresponding to $x$ is a noun and whose part corresponding to $y$ is a verb, based on the setting shown in FIG. 6. In this case, if the dictionary form of the verb corresponding to $y$ is "suru", the solution request sentence set acquisition unit 101 determines that the constraint is not satisfied, and excludes the sentence from the positive example solution request sentence set or the negative example solution request sentence set. The solution request sentence set acquisition unit 101 may perform the exclusion process on the above-mentioned temporarily stored data.

The following describes the process of extracting the character strings corresponding to $x$ and $y$ by the solution request sentence set acquisition unit 101, in detail.

The solution request sentence set acquisition unit 101 clips each sentence matching the positive example solution request pattern or the negative example solution request pattern, in a predetermined sentence unit. To clip one sentence, the solution request sentence set acquisition unit 101 may simply perform a process of detecting a nearby "period", "tab", "newline", or the like before and after the part matching the pattern, and setting a character next to the detection before the part as a sentence start and a character of the detection after the part as a sentence end.

Following this, the solution request sentence set acquisition unit 101 performs morphological analysis on the clipped one sentence, and extracts character strings of words corresponding to $x$ and $y$ both of which satisfy the constraints of "Accept" and also do not apply "Deny". The solution request sentence set acquisition unit 101 stores the clipped one sentence and the extracted character strings corresponding to $x$ and $y$, in association with the temporarily stored data. Here, if any of the extracted character strings is a verb, the solution request sentence set acquisition unit 101 converts the character string to the dictionary form, and then temporarily stores the data as $x$ and $y$.

The sentence unit for clipping is not limited to one sentence, and may be designated as several consecutive sentences, the number of characters, or the like. For instance, such designation may be made by the user of the information extraction device 1 in a configuration file of the solution request sentence set acquisition unit 101.

FIG. 7 shows an example of temporarily stored data temporarily stored by the solution request sentence set acquisition unit 101 through the above-mentioned process. In the temporarily stored data shown in FIG. 7, a data set in a row having a value "P" in a flag column is the positive example solution request sentence set, and a data set in a row having a value "N" in the flag column is the negative example solution request sentence set. The morphological analysis result of each sentence stored in a relevant sentence field of the temporarily stored data shown in FIG. 7 may be stored in association, too. Since the morphological analysis result is also used in subsequent processing, storing the morphological analysis result here makes it unnecessary to perform morphological analysis again, which contributes to processing speedup.

Regarding steps S12 and S13, by performing morphological analysis on all documents included in the corpus storage unit 40 and assigning word class information to each word beforehand, phrase search with a search condition including word classes such as "$ noun $ ya $ verb $ nai you ni shi" can be executed at high speed. An example of a technique enabling such search is described in Yukitaka Kusumura, Toshiyuki Kamiya "A Data Management System for Interactive Text Mining", Information Processing Society of Japan, Database System Research Committee, 2008.

Lastly, the solution request sentence set acquisition unit 101 organizes the positive example solution request sentence set and the negative example solution request sentence set, for each problem evoking expression.

In detail, the solution request sentence set acquisition unit 101 classifies the temporarily stored data into data matching the problem evoking expression, and then combines data of the same value stored in the flag field together, thereby organizing output data. This corresponds to the process of step S14 in FIG. 5.

FIG. 8 shows an example of a storage format of an output result. The example shown in FIG. 8 includes problem evoking expression data 204 for managing each problem evoking expression (FIG. 3(*a*)), a positive example solution request sentence set 205 (FIG. 8(*b*)), and a negative example solution request sentence set 206 (FIG. 8(*c*)).

The problem evoking expression data 204 includes an expression ID which is an identifier for specifying each problem evoking expression, a pattern type ID for specifying an expression structure of the problem evoking expression, a word indicating the problem evoking expression, and the problem evoking expression.

The solution request sentence set acquisition unit 101 assigns a unique expression ID to data, in the temporarily stored data as shown in FIG. 7, that has a unique combination of character strings stored in $x$ and $y$.

The solution request sentence set acquisition unit 101 also extracts the value of the expression structure field in the pattern type table 201. The solution request sentence set acquisition unit 101 creates a problem evoking expression by associating the parts representing arbitrary character strings such as $x$ and $y$ included in the extracted value with the values of $x$ and $y$ included in the temporarily stored data, and stores the problem evoking expression in the problem evoking expression data 204.

Though the arbitrary character strings are $x$ and $y$ in this exemplary embodiment, their pattern type may differ as mentioned earlier. In $x$ and $y$ in the problem evoking expression data 204, word class information is also recorded in the form "@ word class", to indicate the word class of the extracted character string. Note that, when reading the character string stored in each of $x$ and $y$, the character string after @ is ignored.

The positive example solution request sentence set 205 and the negative example solution request sentence set 206 are stored in such a format that enables a relevant sentence including a problem evoking expression to be referenced to by using an expression ID of the problem evoking expression as a key. The morphological analysis result may be stored in association with each of the above-mentioned relevant sentences, as in the temporarily stored data. The tabular output format described above is merely an example, and a method other than this may be used for storage. For instance, a method using a structured format of XML or the like is applicable.

In the example shown in FIG. 7, the solution request sentence set acquisition unit 101 performs classification into two combinations that are a combination of "iro" (color) and "nijimu" (bleed) and a combination of "kami" (paper) and "tsumaru" (jammed) which the values of $x$ and $y$ both match. That is, the solution request sentence set acquisition unit 101 extracts two problem evoking expressions.

After this, the solution request sentence set acquisition unit 101 classifies the data into those whose value stored in the flag field is "P" and those whose value stored in the flag field is "N". As a result, the solution request sentence set acquisition unit 101 organizes six pieces of data shown in FIG. 7 into two positive example solution request sentence sets and two negative example solution request sentence sets for the problem evoking expression "iro ga nijimu" (color bleeds), and into one positive example solution request sentence set and zero negative example solution request sentence set for the problem evoking expression "kami ga tzumaru" (paper is jammed), as shown in FIG. 8.

Note that the solution request sentence set acquisition unit 101 may perform the process on an assumption that the request is made, only in the case where a certain number of elements of the positive example solution request sentence set and the negative example solution request sentence set are extracted. In the extraction process of the positive example solution request sentence set and the negative example solution request sentence set, there is a rare case where a sentence which is not a solution request sentence matches the pattern. To avoid influence of such erroneous detection, for instance, a threshold is set beforehand. If the number of elements of the positive example solution request sentence set and the negative example solution request sentence set collected for each problem evoking expression does not exceed the threshold, the solution request sentence set acquisition unit 101 deletes the corresponding data from the positive example solution request sentence set 205 or the negative example solution request sentence set 206.

Besides, it may be impossible to sufficiently extract both the positive example solution request sentence set and the negative example solution request sentence set. For instance, in many cases "kami ga tsumaru" (paper is jammed) is used when the problem actually occurs, and so negative examples are hardly obtained. In the case where the positive example solution request sentence set and the negative example solution request sentence set corresponding to a problem evoking expression are both not extracted, the solution request sentence set acquisition unit 101 deletes the problem evoking expression from the problem evoking expression data 204.

The solution request sentence set acquisition unit 101 outputs the positive example solution request sentence set and the negative example solution request sentence set of each problem evoking expression, to the identification information specification unit 102.

Figures 9, 10:
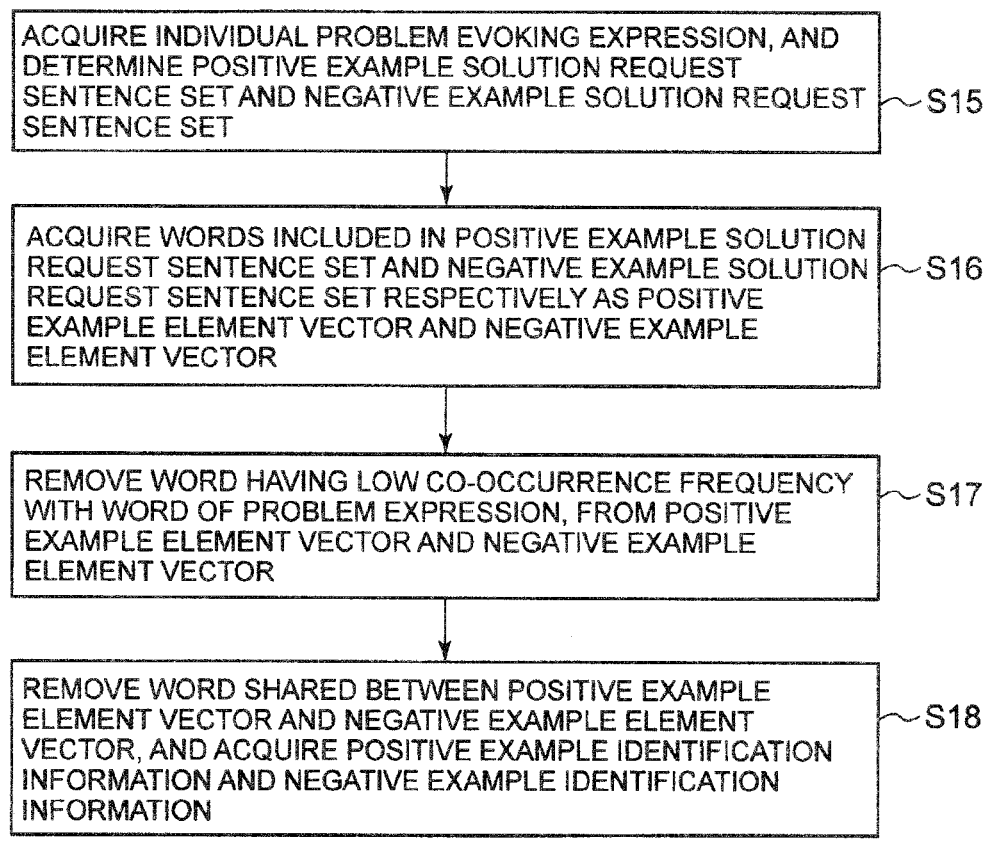
FIG. 9 It depicts a flowchart showing an operation example of an identification information specification unit 102.
FIG. 10 It depicts an explanatory diagram showing an example of extracting words included in a positive example solution request sentence set and a negative example solution request sentence set.

The following describes the operation of the identification information specification unit 102. FIG. 9 is a flowchart showing an operation example of the identification information specification unit 102. Note that the subsequent process is performed for each problem evoking expression.

As shown in FIG. 9, the identification information specification unit 102 first references to the problem evoking expression data 204, and extracts the expression ID stored in the expression ID field. Using the extracted expression ID as a key, the identification information specification unit 102 extracts each sentence stored in the relevant sentence field from the positive example solution request sentence set 205 and the negative example solution request sentence set 206, to determine the processing target. This corresponds to the process of step S15 in FIG. 9.

Suppose the identification information specification unit 102 receives the output result shown in FIG. 8 from the solution request sentence set acquisition unit 101. The identification information specification unit 102 references to the problem evoking expression data 204, and sets, as the processing target, the problem evoking expression "iro ga nijimu" (color bleeds) of the expression ID "1" extracted first. The identification information specification unit 102 extracts two relevant sentences from each of the positive example solution request sentence set 205 and the negative example solution request sentence set 206, using the expression ID "1" as a key.

Next, the identification information specification unit 102 performs morphological analysis on the relevant sentences extracted from the positive example solution request sentence set 205 and the negative example solution request sentence set 206 as the processing target. The identification information specification unit 102 collects words of a predetermined word class from each relevant sentence, and creates a word vector for each of the positive example solution request sentence set 205 and the negative example solution request sentence set 206. This corresponds to the process of step S16 in FIG. 9.

The word vectors of the positive example solution request sentence set and the negative example solution request sentence set created for each problem evoking expression are hereafter referred to as a positive example element vector and a negative example element vector, respectively. Each element of the positive example element vector and the negative example element vector corresponds to a specific word, and the presence or absence of the word is represented by 1 or 0 or the number of occurrences of the word in the positive example solution request sentence set or the negative example solution request sentence set is recorded.

In this exemplary embodiment, an element of the positive example element vector for a word i is denoted by $x_i$, and an element of the negative example element vector for the word i is denoted by $y_i$. The positive example element vector and the negative example element vector are set as vectors of the same number of elements, for ease of processing. If there is no corresponding word, the element is assigned 0.

For instance, data indicating the predetermined word class for the word vector is provided by the user or the like in a configuration file or the like beforehand. The identification information specification unit 102 reads the configuration file upon startup, and acquires the data indicating the word class. The use of the configuration file enables the user of the information extraction device 1 to arbitrarily change the word class for the word vector. In the case of using a pre-fixed word class such as a noun, however, the above-mentioned data indicating the word class may be hard-coded to a program for operating the identification information specification unit 102.

In the case where each relevant sentence of the output result output from the solution request sentence set acquisition unit 101 is associated with the morphological analysis result as mentioned earlier, the identification information specification unit 102 does not need to perform morphological analysis again. When extracting the word vector, a list of stop words may be prepared in order to exclude clearly unwanted words. The identification information specification unit 102 reads the list of stop words, and performs control so that any word matching the list is not used in the positive example element vector or the negative example element vector.

FIG. 10 shows an example of a positive example element vector and a negative example element vector for the problem evoking expression "iro ga nijimu" (color bleeds) created in this process. Words not included in the relevant sentences shown in FIG. 8 are also shown in FIG. 10, as the extraction is performed not only from the two pieces of data in each of the positive example solution request sentence set 205 and the negative example solution request sentence set 206 shown in FIG. 8 but also from more data. FIG. 10 shows not a vector format but a list of words included in each of the positive example element vector and the negative example element vector, due to space limitation. Moreover, only the presence or absence of words is concerned in this example, for simplicity's sake.

Next, the identification information specification unit 102 removes each word having a low co-occurrence frequency with the problem evoking expression, from the positive example element vector and the negative example element vector. This corresponds to the process of step S17 in FIG. 9.

The problem evoking expression in a sentence that includes a word having a value in the positive example element vector has a higher possibility of truly representing the problem. The problem evoking expression in a sentence that includes a word having a value in the negative example element vector has a higher possibility that the state is desirable. If such a word is closely related to the problem evoking expression, the presence or absence of the word serves as a criterion for determining whether or not the problem evoking expression is truly a problem evoking expression.

The identification information specification unit 102 first extracts the words of $x$ and $y$ using the expression ID as a key, in the problem evoking expression data 204. The identification information specification unit 102 also specifies a word that has little co-occurrence with $x$ and $y$, in the corpus storage unit 40.

For instance, the identification information specification unit 102 obtains the number Nx of search hits of $x$, using a search engine. The identification information specification unit 102 then performs AND search with a query for $x$ and each word in the word vector, to obtain the number Mxi of hits. The identification information specification unit 102 determines that the word co-occurs, in the case where a ratio between Mxi and Nx exceeds a predetermined threshold α or Mxi exceeds a predetermined threshold β.

The identification information specification unit 102 may use a method of storing a dictionary containing a value of each co-occurrence frequency between words beforehand so that the co-occurrence frequency can be easily obtained using $x$ and the word i as a key. Though the dictionary is useful for many occasions, certain time is required to compute the co-occurrence frequency between all sorts of words. In the case where the identification information specification unit 102 stores the dictionary, a path from the corpus storage unit 40 to the identification information specification unit 102 in the block diagram shown in FIG. 3 is unnecessary.

This process is intended to enhance the training data extraction precision, and so is not essential in the identification information specification unit 102. For instance, if the user of the information extraction device 1 designates not to perform the process of step S17 beforehand, the training data creation speed can be increased accordingly. Besides, the path from the corpus storage unit 40 to the identification information specification unit 102 in the block diagram shown in FIG. 3 is unnecessary. Whether or not to perform the process of step S17 is, for example, determined in a configuration file or the like.

Lastly, the identification information specification unit 102 compares the positive example element vector and the negative example element vector, and excludes each word shared between the positive example element vector and the negative example element vector. The identification information specification unit 102 then specifies positive example identification information and negative example identification information for characterizing the positive example solution request sentence set and the negative example solution request sentence set. This corresponds to the process of step S18 in FIG. 9.

The following describes a process of updating the positive example element vector and the negative example element vector. The identification information specification unit 102 uses the following Equation (1), to obtain each word characterizing the positive example solution request sentence set from the positive example element vector.

$$x'i = \max(xi - yi, 0) \quad \text{Equation (1)}$$

In Equation (1), max is a function of prioritizing a larger one of arguments. According to Equation (1), in the case where xi is larger than yi, x'i has a value. In the case where yi is larger than xi, on the other hand, the value of the element is 0.

Likewise, the identification information specification unit 102 uses the following Equation (2), to obtain each word characterizing the negative example solution request sentence set from the negative example element vector.

$$y'i = \max(yi - xi, 0) \quad \text{Equation (2)}$$

Equation (2) inverts xi and yi in Equation (1). The identification information specification unit 102 excludes each word i whose element is 0 in x'i and y'i computed according to Equations (1) and (2). A vector of x'i computed in this way is referred to as positive example identification information, and a vector of y'i as negative example identification information. The positive example identification information and the negative example identification information respectively characterize the positive example solution request sentence set and the negative example solution request sentence set.

For instance, in the case where an unknown sentence includes a problem evoking expression, the identification information specification unit 102 collects its surrounding words (in detail, extracts the surrounding words and temporarily stores them in the storage unit). The identification information specification unit 102 compares each individual element of the word set with the positive/negative identification information, and computes a sum of matching positive example identification information and a sum of matching negative example identification information. If the positive example identification information sum is larger than the negative example identification information sum, the identification information specification unit 102 can determine that the sentence including the problem evoking expression actually evokes a problematic situation.

The identification information specification unit 102 associates the positive example identification information and the negative example identification information with the problem evoking expression, and outputs them. FIG. 11 shows an example of an output format. In the example shown in FIG. 11, information are stored in a data format of three tables that are the problem evoking expression data 204, positive example identification information 207, and negative example identification information 208. In FIG. 11, too, the positive example identification information and the negative example identification information are shown not in a word vector format but in a word list, due to space limitation. Words included in FIG. 10 but not included in FIG. 11 are those excluded in the processes of steps S16 and S17.

The positive example identification information and the negative example identification information may include not only character string information of each word but also word class information of the word and information of a feature such as a character string or a word class relating to a word representing a problem evoking expression in a relation obtained as a result of morphological analysis.

The identification information specification unit 102 may compute one vector as identification information according to the following Equation (3), instead of separating the positive example identification information and the negative example identification information. Here, a vector having zi as a value of an element for the word i is referred to as positive/negative identification information.

$$zi = xi - yi \qquad \text{Equation (3)}$$

For instance, in the case where an unknown sentence includes a problem evoking expression, the identification information specification unit 102 collects its surrounding words (in detail, extracts the surrounding words and temporarily stores them in the storage unit). The identification information specification unit 102 compares each individual element of the word set with the positive/negative identification information, and computes a sum of matching zi. If the sum is positive, the identification information specification unit 102 can determine that the sentence including the problem evoking expression actually evokes a problematic situation.

The identification information specification unit 102 associates the positive example identification information and the negative example identification with the problem evoking expression, and outputs them to the output unit 103.

The following describes the operation of the output unit 103. When the identification information specification unit 102 outputs the above-mentioned information, the output unit 103 presents the positive example identification information and the negative example identification information in association with the problem evoking expression, so as to be understandable by the user of the information extraction device 1. For instance, a method of displaying each of the problem evoking expression, the positive example identification information, and the negative example identification information as a field in a tabular format on the display unit is available The output unit 103 is typically realized by the output device 7.

As described above, in Exemplary Embodiment 1, a problem evoking expression and identification information indicating whether or not the problem evoking expression actually represents a problem can be present together, with it being possible to correctly determine whether or not a superficial character string is actually a problem evoking expression.

In the method described in PTL 1, document data matching a search purpose is treated as a positive example, and document data not matching the search purpose is treated as a negative example. In this exemplary embodiment, on the other hand, a document set requesting to achieve a purpose is treated as a positive example, and a document set not requesting to achieve the purpose (opposite request) is treated as a negative example.

For instance, when a keyword in search is "iro ga nijimu" (color bleeds), a document set matching "iro ga nijimu you ni shitai" (want color to bleed) is treated as a positive example, and a document set matching "iro ga nijimanai you ni shitai" (want color not to bleed) is treated as a negative example. In term of the context of PTL 1, in this exemplary embodiment, two search expressions of opposite meanings are used where a document set matching one search purpose is treated as a positive example and a document set matching the other search purpose is treated as a negative example. Thus, not a single search purpose but two purposes of different meanings are used in this exemplary embodiment.

Hence, the criterion for identifying positive examples and negative examples in this exemplary embodiment distinguishes between a condition desiring a request and a condition not desiring the request, and so is useful for finding a condition of distinguishing whether or not a problem expression candidate actually represents a problem. Therefore, in this exemplary embodiment, even the superficially same problem evoking expression can be classified depending on whether there is a request sentence meaning to want to avoid a state of a problem or a request sentence meaning to want the state, and surrounding words, word classes, and the like usable for such classification can be extracted as identification information.

Exemplary Embodiment 2

Figure 12:
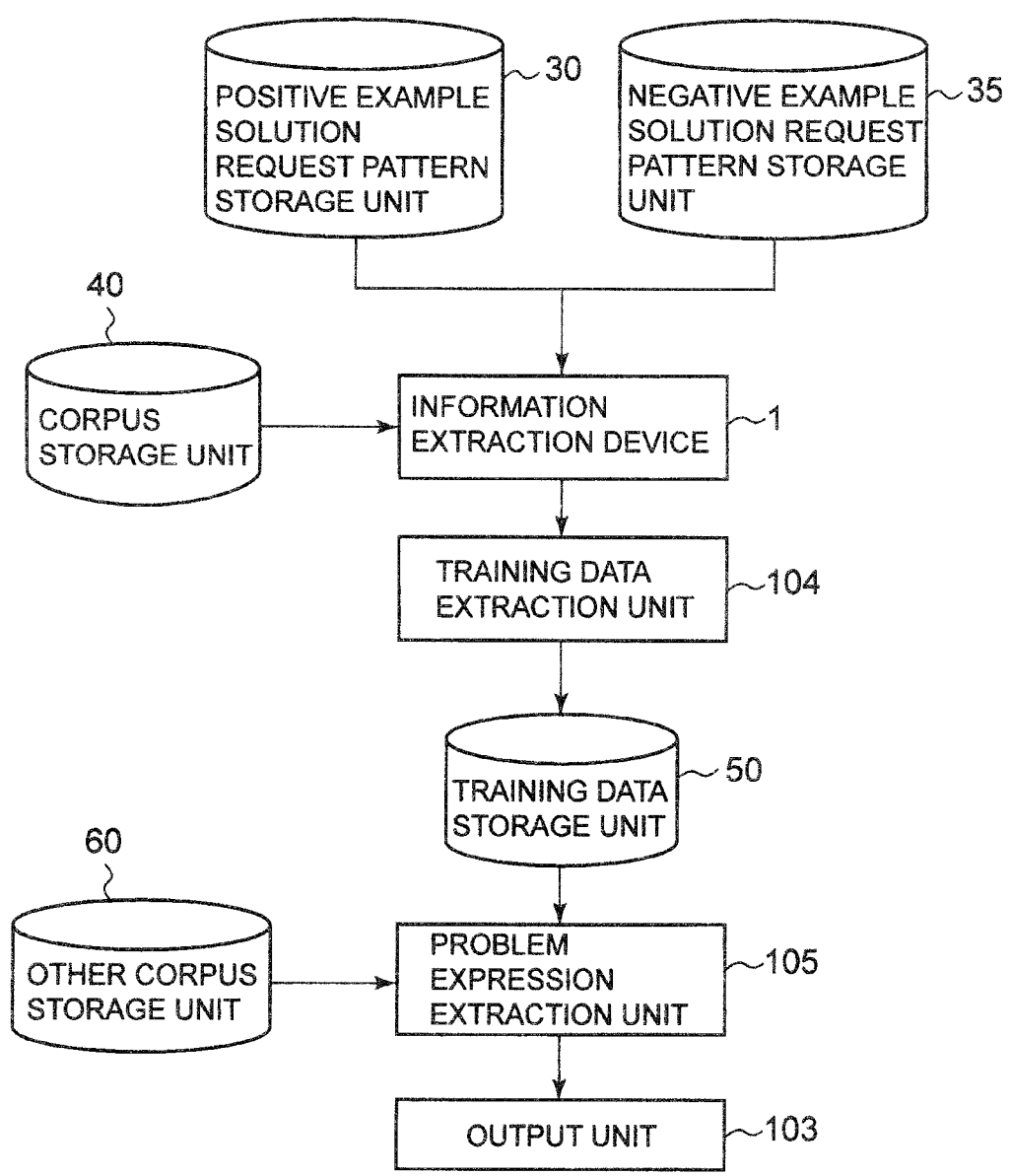
FIG. 12 It depicts a block diagram showing an example of a functional structure of Exemplary Embodiment 2 of the information extraction system.

The following describes a problem expression extraction system using the information extraction device 1 as Exemplary Embodiment 2 of the present invention. FIG. 12 is a block diagram showing an example of a functional structure of a problem expression extraction system according to the exemplary embodiment of the present invention. The problem expression extraction system is typically realized by an information processing device such as a personal computer operating according to a program. Though the information extraction device 1 and the other functional units and the like are separate from each other in the problem expression extraction system in this exemplary embodiment, they may be realized by the same information processing device.

The information extraction device 1 described in Exemplary Embodiment 1 is capable of acquiring identification information for identifying whether or not a problem evoking expression actually evokes a problem. This can be utilized to distinguish whether or not a sentence which superficially includes a problem evoking expression actually evokes a problem. In this exemplary embodiment, the problem expression extraction system uses such information as positive examples and negative examples in training data, thereby formulating extraction rules by machine learning and extracting a problem evoking expression.

The problem expression extraction system in this exemplary embodiment uses training data of positive examples/ negative examples in consideration of context, and accordingly extraction rules reflecting them exhibit high identification precision.

In Exemplary Embodiment 2 of the present invention, a training data extraction unit 104 for extracting training data from the corpus storage unit 40, a training data storage unit 50 for storing training data, a problem expression extraction unit 105 for extracting a problem evoking expression using training data, and an other corpus storage unit 60 which is a data group for extracting a problem evoking expression are included in addition to those in Exemplary Embodiment 1.

The process up to obtainment of training data using the information extraction device 1 is the same as in Exemplary Embodiment 1, and so its description is omitted.

The training data extraction unit 104 is typically realized by a CPU of an information processing device operating according to a program. The training data extraction unit 104 extracts training data from the corpus storage unit 40, on a premise that a similar word occurs in a solution request sentence and a sentence describing a problem.

This premise is based on an assumption that, for instance regarding a sentence including a request "iro ga nijimanai you ni shitai" (want color not to bleed) and a sentence describing "iro ga nijinda" (color bled) as a problem evoking expression, a similar word such as "purinta" (printer) is included near both sentences as in "purinta de iro ga nijimanai you ni shitai" (want color not to bleed on printer) and "purinta de iro ga nijinde shimatta" (color bled on printer).

Figure 13:
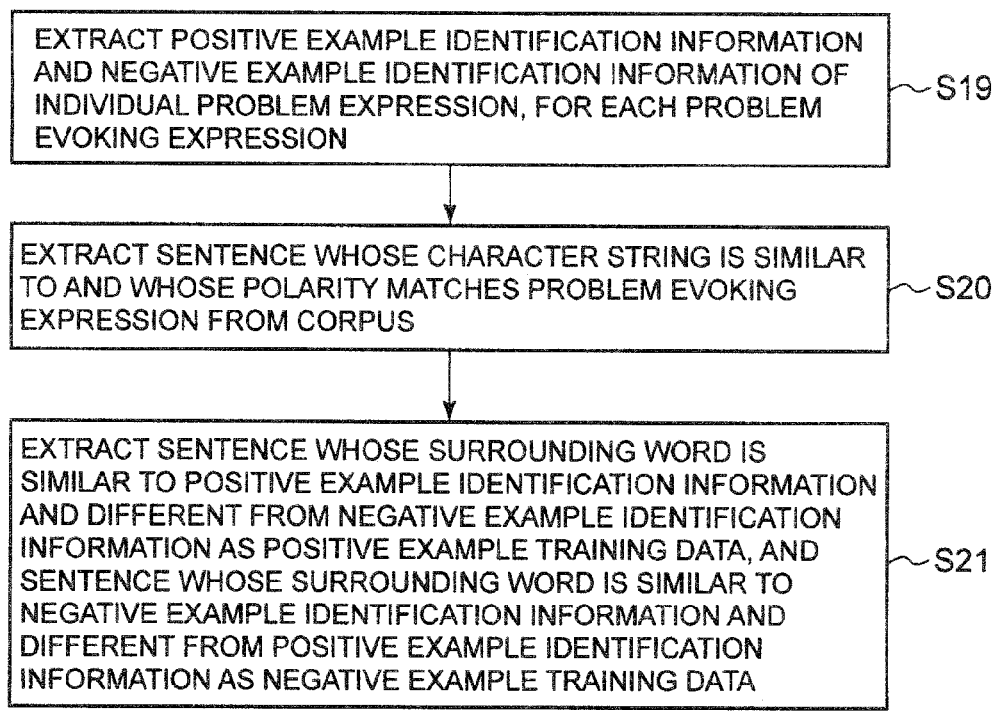
FIG. 13 It depicts a flowchart showing an operation example of a training data extraction unit 104.

FIG. 13 is a flowchart showing the operation of the training data extraction unit 104. The training data extraction unit 104 first receives positive example identification information and negative example identification information associated with a problem evoking expression from the identification information specification unit 102, and performs the following process for each problem evoking expression. This corresponds to the process of step S19 in FIG. 13.

In the case where the positive example identification information 207 and the negative example identification information 208 are given in the format shown in FIG. 11, the training data extraction unit 104 references to the value stored in the expression ID field in each of the positive example identification information 207 and the negative example identification information 208, and acquires word vectors of the same value as a pair. The training data extraction unit 104 extracts training data for each pair of word vectors of the positive example identification information and the negative example identification information.

Next, the training data extraction unit 104 extracts each sentence whose superficial character string substantially matches the problem evoking expression and whose polarity is the same as the problem evoking expression, from the corpus storage unit 40. This corresponds to the process of step S20 in FIG. 13.

In detail, the training data extraction unit 104 references to the problem evoking expression data 204 using the expression ID as a key, and extracts a character string stored in the problem evoking expression field. When the expression ID is "1", the training data extraction unit 104 extracts "iro ga nijimu" (color bleeds).

Next, the training data extraction unit 104 searches the sentences in the corpus storage unit 40 using a query including "iro ga nijimu" (color bleeds). In the case where the problem evoking expression includes a verb, the end of the word changes in a plurality of patterns depending on the verb's conjugation. Accordingly, in the case where $x$ or $y$ is constrained as a verb in, for instance, a configuration file of the solution request sentence set acquisition unit 101, the training data extraction unit 104 performs search with the end of the word changed in consideration of the verb's conjugation.

For instance, in the case of "iro ga nijimu" (color bleeds), the training data extraction unit 104 changes the end as "iro ga nijimi", "iro ga nijimu", "iro ga nijime", and "iro ga nijin". Rules such as changing the ending character in the dictionary form of the verb from "a" row to "u" row and, in the case where the ending character in the dictionary form of the verb is "mu", also adding "n" to the change are incorporated beforehand in the configuration file used by the solution request sentence set acquisition unit 101. If each sentence stored in the corpus storage unit 40 can be morphologically analyzed beforehand, by including the dictionary form of the verb in an index, all relevant sentences can be found just by "iro ga nijimu" (color bleeds).

The training data extraction unit 104 checks whether or not such an extracted sentence matches the above-mentioned problem evoking expression in polarity. In detail, matching in polarity means that, when the problem evoking expression is an affirmative sentence "iro ga nijimu" (color bleeds), then the extracted sentence is also an affirmative sentence for "iro ga nijimu" (color bleeds).

In the case where the extracted sentence is a negative sentence such as "iro ga nijimanai" (color does not bleed), the training data extraction unit 104 determines that the polarity does not match, and excludes the sentence from the sentences extracted from the corpus storage unit 40. This is in consideration of that, in the case where an expression corresponding to a problem evoking expression differs in polarity, the expression does not serve as a problem evoking expression.

As a result of the above-mentioned process, the training data extraction unit 104 acquires each sentence including the problem evoking expression.

Following this, the training data extraction unit 104 extracts an extracted sentence whose surrounding word is similar to the positive example identification information and different from the negative example identification information, as positive example training data. The training data extraction unit 104 also extracts an extracted sentence whose surrounding word is similar to the negative example identification information and different from the positive example identification information, as negative example training data. This corresponds to the process of step S21 in FIG. 13.

The positive example identification information includes a word that tends to be included in a sentence requesting to solve a problem represented by the problem evoking expression. Therefore, a sentence that includes the problem evoking expression and includes the word of the positive example identification information is expected to be a sentence that actually represents the problem, and so is suitable as positive example data. Meanwhile, a sentence that includes the problem evoking expression and includes the negative example identification information represents a situation of "wanting the state of the problem evoking expression", and so is suitable as negative example data because there is a high possibility that the state of the problem evoking expression is favorable.

In view of this, the training data extraction unit 104 first clips each sentence that includes the problem evoking expression and matches the problem evoking expression in polarity, in a sentence unit. The method of clipping one sentence is the same as the method executed by the solution request sentence set acquisition unit 101 in Exemplary Embodiment 1. The clipped sentence is not limited to one sentence, and may be designated as several consecutive sentences, the number of characters, or the like.

The training data extraction unit 104 performs morphological analysis on the clipped sentence, and extracts a word and feature information of the same condition as the identification information from the sentence extracted from the corpus storage unit 40. For instance, when the identification information is made up of noun words, the word extracted here is a noun, too. The word and feature information obtained from the extracted sentence are referred to as sentence constitution information.

The training data extraction unit 104 compares the sentence constitution information and the positive example identification information, and determines the sentence as positive example training data if the sentence constitution information includes the positive example identification information by a predetermined threshold or more. Likewise, the training data extraction unit 104 determines the sentence as negative example training data if the sentence constitution information includes the negative example identification information by the predetermined threshold or more. In the case where the sentence constitution information includes both the positive example identification information and the negative example identification information by the predetermined threshold or more or in the case where the sentence constitution information includes neither the positive example identification information nor the negative example identification information by the predetermined threshold or more, the training data extraction unit 104 concludes that the determination is impossible, and does not use the data as training data. The predetermined threshold is, for instance, set in a configuration file for the training data extraction unit 104 or the like by the user of the information extraction device 1.

FIG. 14 shows an example of a storage format of positive example training data and negative example training data for each problem evoking expression extracted by the training data extraction unit 104. As shown in FIG. 14, these data are composed of the above-mentioned problem evoking expression data 204 and training data 209.

As the training data 209, the positive example training data and the negative example training data may be stored separately. In the example of FIG. 14, the positive example training data and the negative example training data are stored together, by indicating whether the example is a positive example "P" or a negative example "N" in a flag field.

In the case of using a plurality of pattern types, the problem evoking expression data 204 and the training data 209 are output for each pattern type. By organizing the data in such a format as the problem evoking expression data 204 and the training data 209, it is possible to, when subsequently using the training data 209, easily reference to which data are to be used as positive examples/negative examples in order to learn which problem evoking expression. Note that each sentence stored in a sentence field of the training data 209 is not a sentence representing a solution request, and accordingly serves as a positive example or a negative example including any of various expressions representing a problem.

Lastly, the training data extraction unit 104 associates the positive example training data and the negative example training data with the problem evoking expression, and stores them in the training data storage unit 50.

The training data storage unit 50 stores data organized so as to indicate which problem evoking expression is represented by sentences in training data as positive examples or negative examples. As long as this is clearly indicated, the recording method is arbitrary. For instance, the training data storage unit 50 may store the data in the format of two tables that are the problem evoking expression data 204 and the training data 209 as shown in FIG. 14. If there are a plurality of pattern types, a pattern type ID field may be provided in each table to record a pattern type ID. This enables training data for problem evoking expressions of a plurality of pattern types to be managed in an integrated manner.

As described above, in this exemplary embodiment, by extracting sentences for identifying positive example identification information and negative example identification information, training data including expressions that superficially match or are similar but differ in whether they are positive or negative examples depending on context or background knowledge can be appropriately extracted from the corpus.

Figure 15:
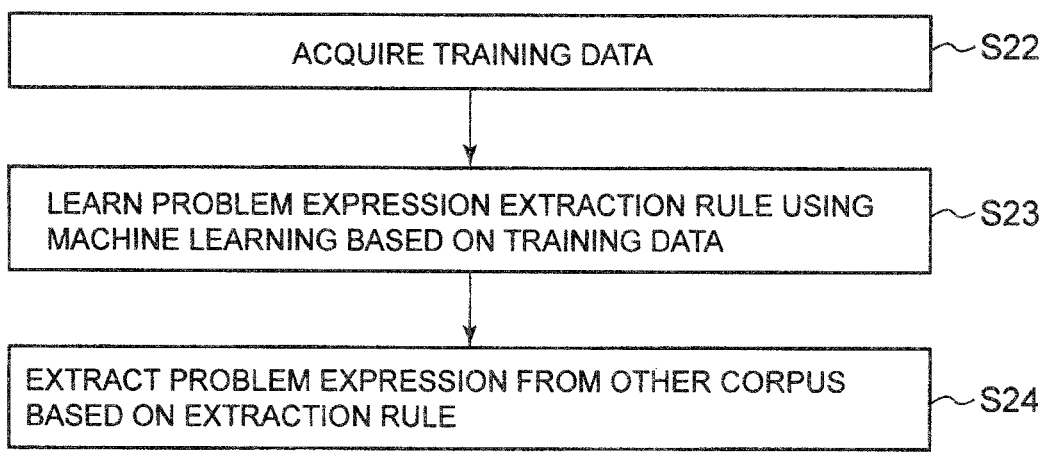
FIG. 15 It depicts a flowchart showing an operation example of a problem expression extraction unit 105.

FIG. 15 is a flowchart showing an operation example of the problem expression extraction unit 105. Here, an expression actually representing a problematic situation is referred to as a problem expression.

The problem expression extraction unit 105 first extracts the training data from the training data storage unit 50. This corresponds to the process of step S22 in FIG. 15.

When extracting the training data, it is desirable that the training data has the same pattern type. Hence, in the case where the training data storage unit 50 includes the pattern type ID field, the problem expression extraction unit 105 extracts the values stored in the sentence field and the flag field for each pattern type ID stored in the pattern type ID field. If there is no pattern type ID, the problem expression extraction unit 105 extracts all values stored in the sentence field and the flag field, on the ground that all stored data are of one pattern type. Each extracted sentence is hereafter referred to as a training sentence.

In the case of learning which part of the training sentence is a problem evoking expression, too, the problem expression extraction unit 105 references to the values stored in the $x$ field, the $y$ field, and the problem evoking expression field of the problem evoking expression data 204, and checks which part of the extracted sentence includes the problem evoking expression. Upon checking, the problem expression extraction unit 105 performs morphological analysis on the sentence, and searches the extracted expression of the dictionary form for the part "$x$ ga $y$". In this check, the problem expression extraction unit 105 does not use word class information described in the format "@ word class" for $x$ and $y$.

Next, the problem expression extraction unit 105 machine-learns extraction rules for extracting a problem expression, based on each extracted training sentence and positive example/negative example information for the training sentence. This corresponds to step S23 in FIG. 15.

In the learning process executed by the problem expression extraction unit 105, the learning target changes according to which unit is regarded as a problem expression. This depends on an application, and therefore needs to be defined by the user of the information extraction device 1.

In the case of using the training data to identify, in a sentence unit, whether or not the problem expression is included, the problem expression extraction unit 105 performs morphological analysis and syntax analysis on the training sentence, sets a word of a predetermined word class included in the training sentence as a feature quantity, and machine-learns rules describing the relation between the feature quantity and the positive example "P" and the negative example "N" indicated by the flag. That is, the machine learning method is a method of learning a binary classifier for determining whether or not the problem expression is included for the feature quantity of the sentence. The machine learning method may be an arbitrary method, for instance, a support vector machine (SVM).

In the case where the problem expression extraction unit 105 performs learning for pinpoint-extracting the part corresponding to the problem expression, this is a binary classification problem of determining whether or not, in an arbitrary sentence, a part of the same expression structure as the problem evoking expression to be learned can be the problem expression. The problem expression extraction unit 105 performs morphological analysis and syntax analysis on the training sentence, sets a word string of a predetermined word class of the training sentence and a word or its word class relating to the problem evoking expression as a feature value, and learns the above-mentioned binary classifier.

To extract the problem expression in a wider range, the problem expression extraction unit 105 extracts "@ word class" stored in $x$ and $y$ of the problem evoking expression data 204, as the part corresponding to the problem evoking expression in the training sentence. The problem expression extraction unit 105 sets each word and word class, a word relating to "@ noun ga @ verb", and the like in the training sentence as a feature value, and performs learning.

Next, the problem expression extraction unit 105 extracts the problem expression from sentences accumulated in the other corpus storage unit 60, based on the acquired learning classifier. This corresponds to the process of step S24 in FIG. 15.

The other corpus storage unit 60 includes a large number of sentences, and which of the sentences is a problem expression is unknown. Since sentences unknown as to whether or not they are problem expressions are also included in the corpus storage unit 40, the other corpus storage unit 60 may include these sentences.

The problem expression extraction unit 105 extracts one sentence at a time from the other corpus storage unit 60, and acquires the same feature quantity as in the learning from the sentence. Whether the problem expression is detected in a sentence unit or the part corresponding to the problem expression is pinpoint-extracted is set to be the same as the unit used in the learning.

Here, not all sentences in the other corpus storage unit 60 are subject to problem expression extraction, but only sentences including the target expression structure ("@ noun ga @ verb" in this example) are subject to problem expression extraction. The problem expression extraction unit 105 inputs the feature quantity of each sentence to the extraction rules, and outputs the classification result and whether or not the sentence is the problem expression.

The problem expression extraction unit 105 associates the sentence including the problem expression and the part corresponding to the problem expression with each other, and outputs them to the output unit 103. In the case of not performing learning to pinpoint-specify the part corresponding to the problem expression, however, the problem expression extraction unit 105 outputs the sentence alone.

This exemplary embodiment describes learning for estimating a part corresponding to a problem expression, so that positive example data can be newly extracted. The use of the training data also enables learning of a sentence that includes a problem evoking expression but does not actually represent a problem.

The output unit 103 presents each problem expression extracted and output by the problem expression extraction unit 105, so as to be understandable by the user of the information extraction device 1. For instance, a method of displaying sentences including problem expressions on the display unit with parts corresponding to the problem expressions being highlighted, a method of displaying sentence including problem expressions and the problem expressions as fields in a tabular format, and the like are available. A method of combining the same problem expressions and displaying the counted numbers on the display unit using a circle graph or a bar graph is also available. Presenting such aggregation results allows the user to recognize problems many people are facing. The output unit 103 is typically realized by the output device 7.

Exemplary Embodiment 2 of the present invention exploits a property that training data of positive examples and negative examples can be created using a problem evoking expression and information identifying whether or not the problem evoking expression actually evokes a problem. The training data extraction unit 104 can collect a sentence set having the same problem evoking expression with the training data but different in its expression method. Moreover, the problem expression extraction unit 105 can create rules for extracting various problem expressions by learning expressions that tend to represent problematic situations, through the use of the sentence set different in expression method.

Exemplary Embodiment 3

Figure 16:
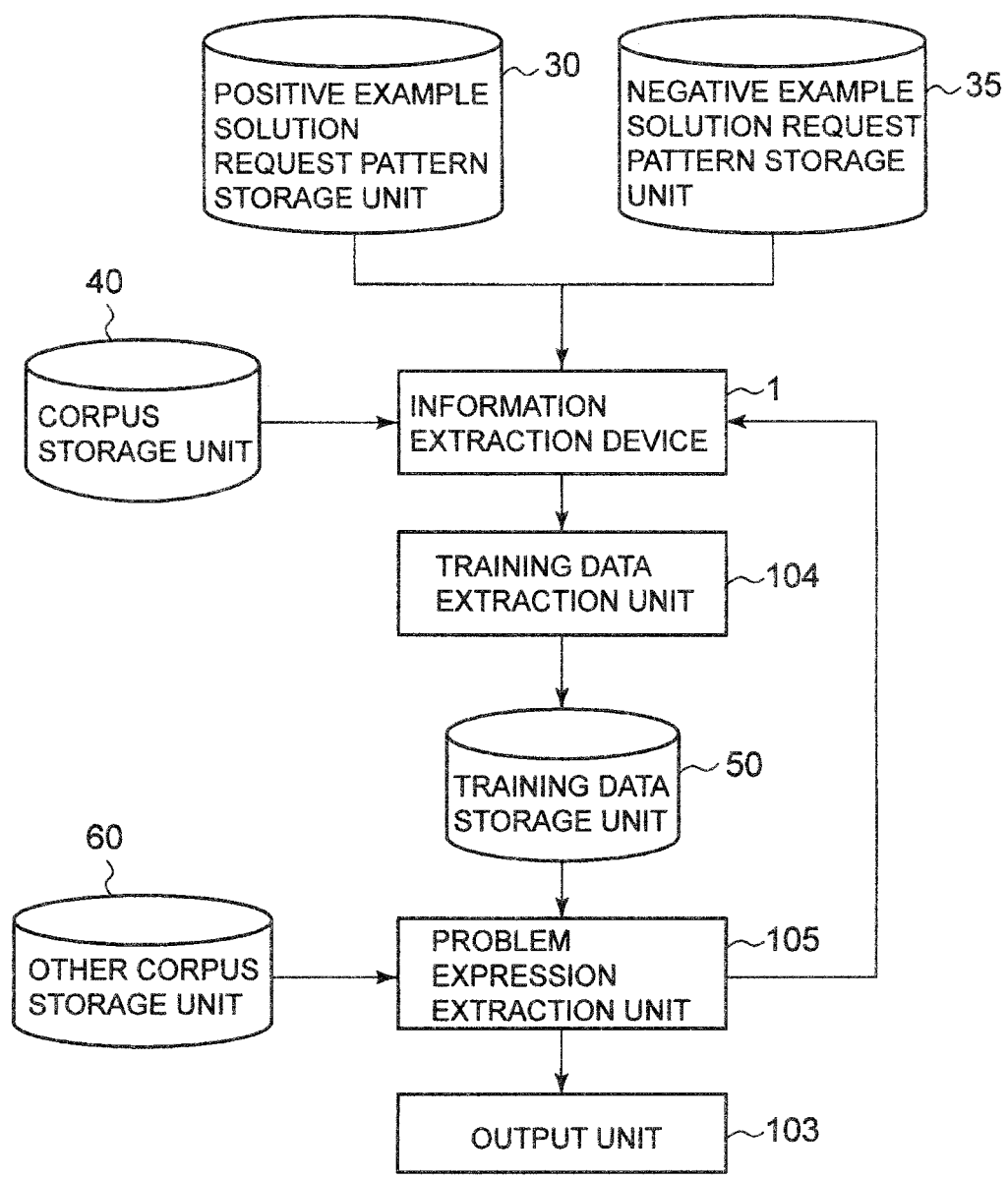
FIG. 16 It depicts a block diagram showing an example of a functional structure of Exemplary Embodiment 3 of the information extraction system.

Exemplary Embodiment 3 of the present invention is a problem expression extraction system for increasing training data by a bootstrap procedure using the information extraction device 1. FIG. 16 is a block diagram showing an example of a functional structure of a problem expression extraction system according to the exemplary embodiment of the present invention. The problem expression extraction system is typically realized by an information processing device such as a personal computer operating according to a program. Though the information extraction device 1 and the other functional units and the like are separate from each other in the problem expression extraction system in this exemplary embodiment, they may be realized by the same information processing device.

Exemplary Embodiment 3 of the present invention has the same components as Exemplary Embodiment 2, but differs from Exemplary Embodiment 2 in that the problem expression extraction result is returned back to the information extraction device 1 in the flow of processing.

Though the basic operation in this exemplary embodiment is the same as that in Exemplary Embodiment 2, the problem expression extraction unit 105 performs problem evoking expression learning so as to pinpoint-extract the character string corresponding to the problem expression. In such a case, in the output result of the problem expression extraction unit 105, the sentence as the problem expression and the problem expression part included in the sentence are clearly indicated. This output result is information equivalent to the input information of the identification information specification unit 102 shown in FIG. 7.

In view of this, in Exemplary Embodiment 3, the result of merging the output result of the problem expression extraction unit 105 according to the output result format of the solution request sentence set acquisition unit 101 is input to the identification information specification unit 102, and the process from the process performed by the identification information specification unit 102 onward is repeated again. This bootstrap procedure increases training data and strengthens extraction rules.

Here, since the output result of the problem expression extraction unit 105 includes erroneously classified data, only data having as low a possibility of erroneous classification as possible is input to the identification method specification unit 102. In the case of performing binary classification by an SVM or the like, a distance of each data point from an identification boundary plane in a feature quantity space can be used to detect whether or not the data is easily classifiable. Easily classifiable data has a high probability of being accurately classified as to whether or not it is a problem expression. Accordingly, the problem expression extraction unit 105 returns only such easily classifiable data to the identification information specification unit 102.

As described above, in Exemplary Embodiment 3, identification information for various problem expressions can be obtained by using problem evoking expression extraction results as seeds of training data.

Exemplary Embodiment 4

Figure 17:
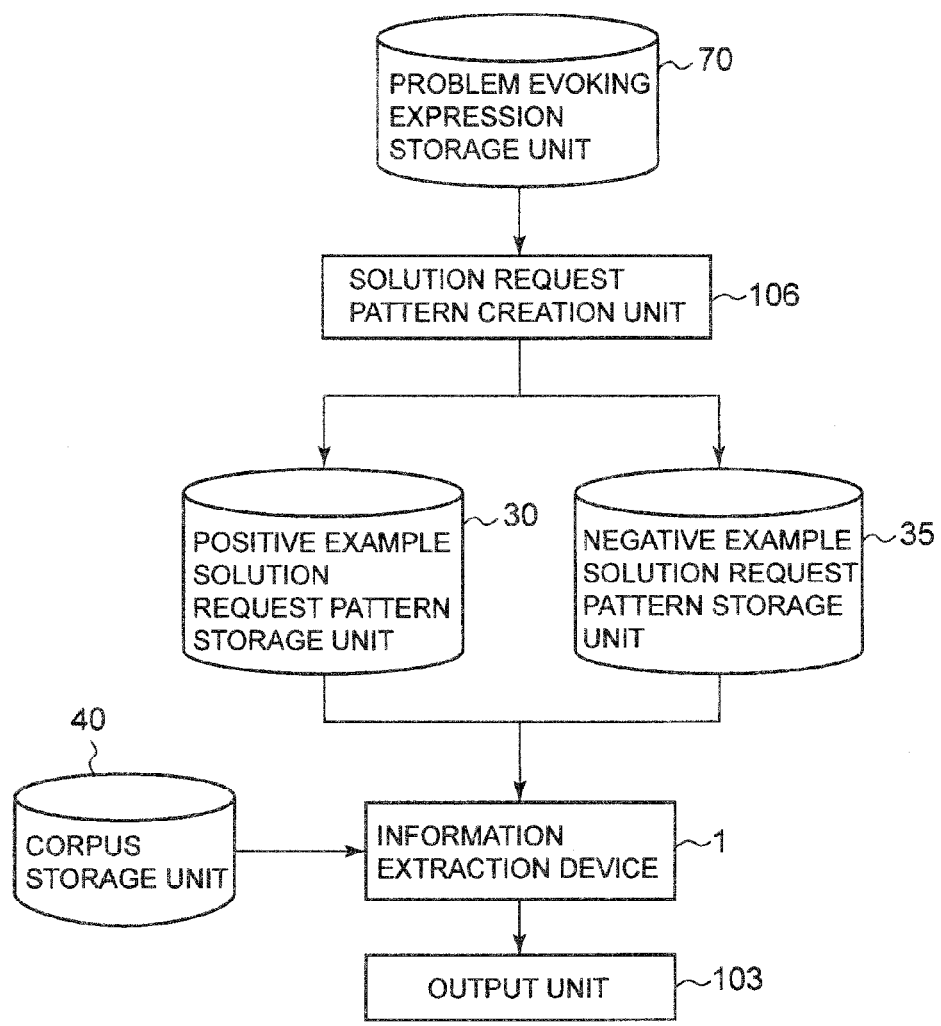
FIG. 17 It depicts a block diagram showing an example of a functional structure of Exemplary Embodiment 4 of the information extraction system.

Exemplary Embodiment 4 of the present invention inputs a problem evoking expression candidate to the information extraction device 1 to operate the information extraction device 1. FIG. 17 is a block diagram showing an example of a functional structure of a problem expression extraction system using the information extraction device 1 according to the exemplary embodiment of the present invention. The problem expression extraction system is typically realized by an information processing device such as a personal computer operating according to a program. Though the information extraction device 1 and the other functional units and the like are separate from each other in the problem expression extraction system in this exemplary embodiment, they may be realized by the same information processing device.

In Exemplary Embodiment 1, a problem evoking expression is extracted using a positive example solution request pattern or a negative example solution request pattern from the corpus storage unit 40. In Exemplary Embodiment 4, on the other hand, when the user of the information extraction device 1 exemplifies a problem evoking expression, identification information for identifying the case where the problem evoking expression actually represents a problem and the case where the problem evoking expression does not actually represent a problem is presented by the device.

In Exemplary Embodiment 4 of the present invention, a problem evoking expression storage unit 70 for storing a problem evoking expression and a solution request pattern creation unit 106 for creating a positive example solution request pattern and a negative example solution request pattern from a problem evoking expression candidate are included in addition to the components in Exemplary Embodiment 1.

The problem evoking expression storage unit 70 stores the same table as the problem evoking expression data 204. It is assumed that the information of the table is manually stored by the user of the information extraction device 1. Suppose the stored data is the problem evoking expression data 204 shown in FIG. 8. In this case, by referencing to the value stored in each of the $x$ field, the $y$ field, and the problem evoking expression field as an expression structure, it can be detected that the user designates the expression structure "$x$ ga $y$" and inputs, each as a combination of $x$ and $y$, "iro" (color) and "nijimu" (bleed), and "kami" (paper) and "tsumaru" (jammed).

In the case of storing a plurality of expression structures for a problem evoking expression, the problem evoking expression storage unit 70 also stores the pattern type table 201 for identifying each pattern type. In such a case, the value of each field in the pattern type table 201 is, for instance, registered by the user. The problem evoking expression storage unit 70 is typically realized by the memory 3, the HDD 4, or the like.

Figure 18:
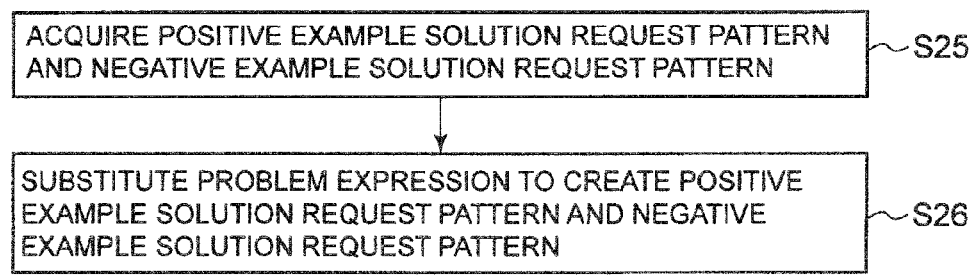
FIG. 18 It depicts a flowchart showing an operation example of a solution request pattern creation unit 106.

The following describes the operation in the exemplary embodiment. FIG. 18 is a flowchart showing the operation of the solution request pattern creation unit 106.

Suppose the solution request pattern creation unit 106 stores the same data as the pattern table 202 in FIG. 3 and the pattern table 203 in FIG. 4. The solution request pattern creation unit 106 may hold both pattern tables in a database or as a configuration file. Note that these pattern tables include a flag field for identifying a positive example solution request pattern "P" and a negative example solution request pattern "N".

The solution request pattern creation unit 106 extracts a positive example solution request pattern and a negative example solution request pattern stored in both pattern tables, in association with a pattern type ID, This corresponds to the process of step S25 in FIG. 18.

Next, the solution request pattern creation unit 106 references to an arbitrary character string in the problem evoking expression data 204, using each extracted pattern type ID as a key. In this exemplary embodiment, the solution request pattern creation unit 106 references to two combinations that are "iro" (color) and "nijimu" (bleed) and "kami" (paper) and "tsumaru" (jammed) stored in the $x$ field and the $y$ field. Though "@ word class" is included in the character string stored in each of the $x$ field and the $y$ field of the problem evoking expression data, the solution request pattern creation unit 106 ignores the description of the word class part in this process.

The solution request pattern creation unit 106 substitutes the referenced character strings of $x$ and $y$ into the extracted positive example solution request pattern and negative example solution request pattern, to create a positive example solution request pattern and a negative example solution request pattern including no regular expression. In the case where $x$ and $y$ have conjugation as in the case of verbs, adjective verbs, adjectives, and the like, the solution request pattern creation unit 106 creates each pattern by converting it to a natural sentence upon substitution.

The solution request pattern creation unit 106 can determine the word class described at $x$ or $y$, by extracting the above-mentioned part "@ word class". The solution request pattern creation unit 106 executes the process of converting to a natural sentence through the use of a heuristic rule.

Take, for example, an expression structure in which $y$ provides a verb in a positive example solution request pattern "$y$ nai you ni suru" (not to $y$). In the case of such a relation "verb+nai", a rule of changing the ending character of the verb designated as $y$ to "a" row can be used. In this way, even when "nijimu" (bleed) is designated as $y$, the solution request pattern creation unit 106 can create a natural sentence "nijimanai you ni" (not to bleed). For instance, such a rule is hard-coded to a program for operating the solution request pattern creation unit 106 beforehand.

Thus, the solution request pattern creation unit 106 creates the positive example solution request pattern and the negative example solution request pattern including no regular expression, for the problem evoking expression candidate input by the user. The solution request pattern creation unit 106 outputs the positive example solution request pattern and the negative example solution request pattern for each problem evoking expression, to the solution request sentence set acquisition unit 101.

Next, the solution request sentence set acquisition unit 101 extracts sentences exactly matching the positive example solution request pattern and the negative example solution request pattern including no regular expression, from the corpus storage unit 40.

Next, the solution request sentence set acquisition unit 101 clips the exactly matching part in a sentence unit. The clipping method may be the same as in Exemplary Embodiment 1. The unit of clipping is not limited to a sentence, and may be designated as several sentences, the number of consecutive characters, or the like.

The sentence set extracted by the solution request sentence set acquisition unit 101 based on the positive example solution request pattern is a positive example solution request sentence set. The sentence set extracted by the solution request sentence set acquisition unit 101 based on the negative example solution request pattern is a negative example solution request sentence set.

The positive example solution request pattern or the negative example solution request pattern is associated with the character string as the problem evoking expression and the sentence including the character string. Thus, the solution request sentence set acquisition unit 101 obtains the tabular data shown in FIG. 7 at this stage. The solution request sentence set acquisition unit 101 accordingly outputs the positive example solution request sentence set and the negative example solution request sentence set associated with the problem evoking expression to the identification information specification unit 102, as in Exemplary Embodiment 1. The subsequent process is the same as in Exemplary Embodiment 1, and so its description is omitted.

As described above, in Exemplary Embodiment 4, when the user of the information extraction device 1 inputs a word considered as a problem evoking expression, identification information for identifying whether or not it actually evokes a problem can be obtained.

Exemplary Embodiment 5

Figure 19:
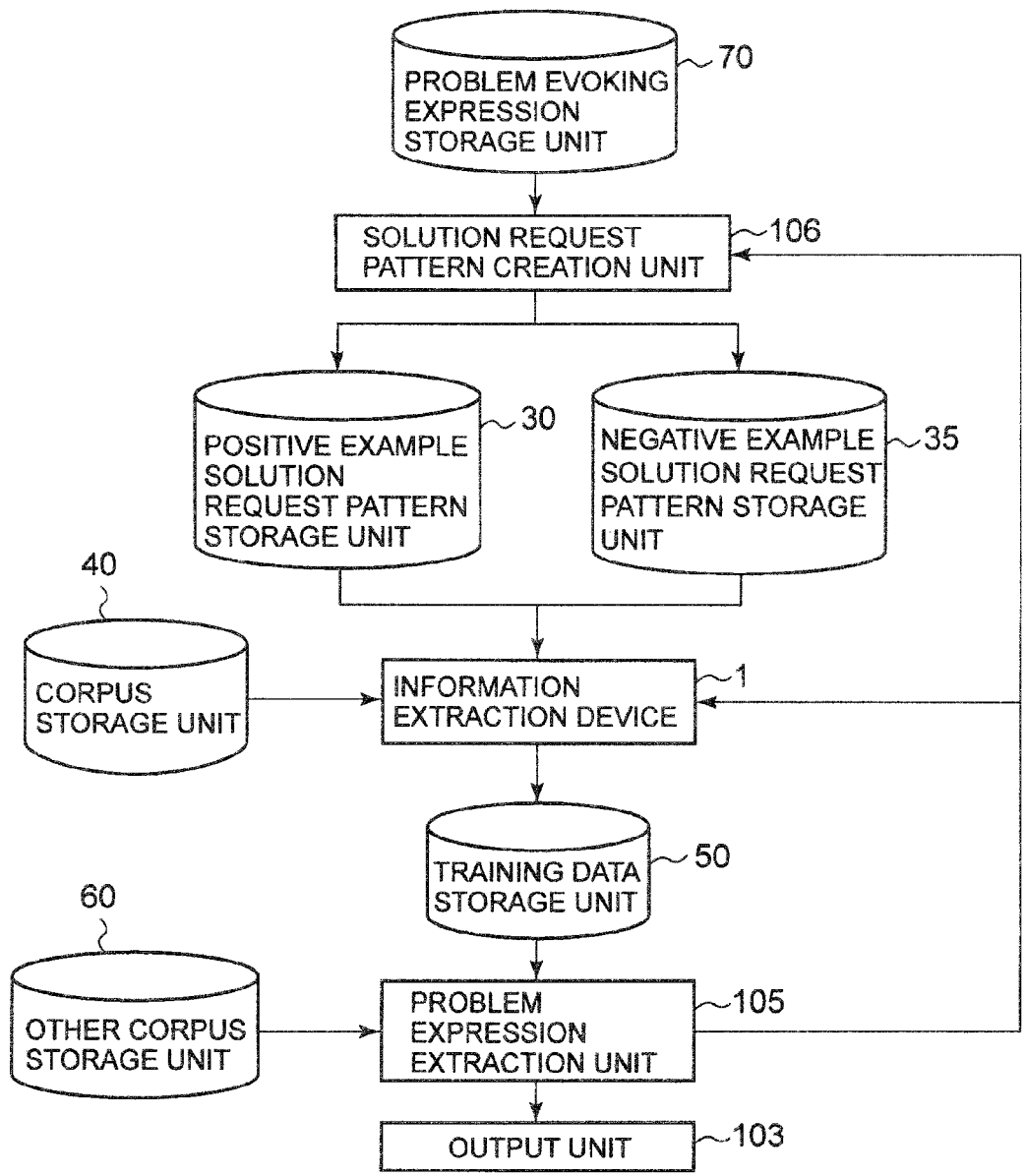
FIG. 19 It depicts a block diagram showing an example of a functional structure of Exemplary Embodiment 5 of the information extraction system.

Exemplary Embodiment 5 of the present invention relates to an operation of a problem expression extraction system using the information extraction device 1. FIG. 19 is a block diagram showing a functional structure of a problem expression extraction system according to the exemplary embodiment of the present invention.

Exemplary Embodiment 5 combines Exemplary Embodiment 3 and Exemplary Embodiment 4, and can increase training data and strengthen extraction rules by bootstrap as in Exemplary Embodiment 3.

This exemplary embodiment differs from Exemplary Embodiment 3 in that, in this exemplary embodiment, the problem evoking expression storage unit 70 and the solution request pattern creation unit 106 are included and the problem evoking expression extracted by the problem expression extraction unit 105 is input to the solution request pattern creation unit 106 as a problem evoking expression candidate. This exemplary embodiment may also combine Exemplary Embodiment 2 and Exemplary Embodiment 4.

In so doing, in this exemplary embodiment, the positive example solution request pattern in which the extracted problem evoking expression represents a problem and the negative example solution request pattern in which the problem evoking expression does not represent a problem can be incorporated into the training data again. Hence, in this exemplary embodiment, identification information for more various problem evoking expressions can be obtained.

Figure 20:
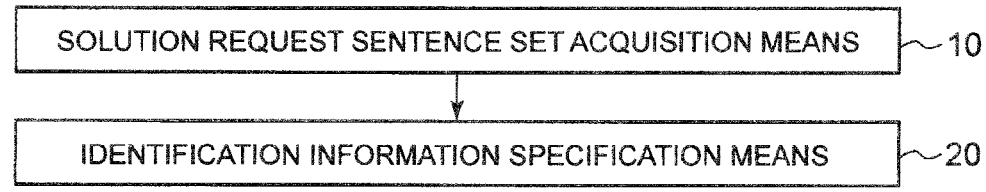
FIG. 20 It depicts a block diagram showing a minimum structure example of the information extraction system.

The following describes a minimum structure of an information extraction system according to the present invention. FIG. 20 is a block diagram showing a minimum structure example of the information extraction system. As shown in FIG. 20, the information extraction system includes solution request sentence set acquisition means 10 and identification information specification means 20 as minimum components.

In the information extraction system of the minimum structure shown in FIG. 20, the solution request sentence set acquisition means 10 acquires, using a positive example solution request pattern representing a positive example of a sentence including the problem evoking expression and a negative example solution request pattern representing an opposite request to the positive example solution request, a sentence set matching the positive example solution request pattern and a sentence set matching the negative example solution request pattern from a corpus respectively as a positive example solution request sentence set and a negative example solution request sentence set.

Next, the solution request sentence set acquisition means 10 stores parts, in the acquired positive example solution request sentence set and negative example solution request sentence set, that correspond to the problem evoking expression in the positive example solution request pattern and the negative example solution request pattern, in a storage unit in association with a positive example and a negative example.

Next, the identification information specification means 20 compares, for each problem evoking expression, constituent elements of sentences included in the positive example solution request sentence set and the negative example solution request sentence set, and specifies a constituent element characterizing the positive example solution request sentence set and a constituent element characterizing the negative example solution request sentence set, respectively as positive example identification information for identifying a positive example of a sentence including the problem evoking expression and negative example identification information for identifying a negative example of a sentence including the problem evoking expression.

Therefore, according to the information extraction system of the minimum structure, even the superficially same problem evoking expression can be classified depending on whether there is a request sentence meaning to want to avoid a state of a problem or a request sentence meaning to want the state, and surrounding words, word classes, and the like usable for such classification can be extracted as identification information.

Note that characteristic structures of the information extraction system as in the following (1) to (8) are shown in this exemplary embodiment, (1) The information extraction system is an information extraction system for extracting identification information for identifying a problem evoking expression which is an expression evoking a problematic situation, the information extraction system including: solution request sentence set acquisition means (e.g. realized by the solution request sentence set acquisition unit 101) for acquiring, using a positive example solution request pattern (e.g. included in the pattern table 202) representing a positive example of a sentence including the problem evoking expression and a negative example solution request pattern (e.g. included in the pattern table 203) representing an opposite request to the positive example solution request, a sentence set matching the positive example solution request pattern and a sentence set matching the negative example solution request pattern from a corpus (e.g. the corpus storage unit 40) respectively as a positive example solution request sentence set (e.g. the positive example solution request sentence set 205) and a negative example solution request sentence set (e.g. the negative example solution request sentence set 206), and storing parts, in the acquired positive example solution request sentence set and negative example solution request sentence set, that correspond to the problem evoking expression in the positive example solution request pattern and the negative example solution request pattern, in association with a positive example and a negative example; and identification information specification means (e.g. realized by the identification information specification unit 102) for comparing, for each problem evoking expression, constituent elements of sentences included in the positive example solution request sentence set and the negative example solution request sentence set, and specifying a constituent element characterizing the positive example solution request sentence set and a constituent element characterizing the negative example solution request sentence set, respectively as positive example identification information for identifying a positive example of a sentence including the problem evoking expression and negative example identification information for identifying a negative example of a sentence including the problem evoking expression.

(2) In the information extraction system, the solution request sentence set acquisition means may acquire the positive example solution request sentence set and the negative example solution request sentence set in association with (e.g. association using expression ID) the problem evoking expression (e.g. the problem evoking expression data 204), using the positive example solution request pattern representing a part corresponding to the problem evoking expression as a regular expression and the negative example solution request pattern representing the problem evoking expression as a regular expression.

(3) In the information extraction system, the solution request sentence set acquisition means may acquire each sentence set according to a constraint (e.g. constraint shown in FIG. 6) that defines, for the problem evoking expression, at least one of: to be a predetermined word class; not to be a predetermined word class; to be a predetermined character string; and not to be a predetermined character string.

(4) In the information extraction system, the solution request sentence set acquisition means may regard the positive example solution request sentence set and the negative example solution request sentence set as empty sets, in the case where the positive example solution request sentence set and the negative example solution request sentence set each include only a smaller number of sentences than a predetermined threshold.

(5) In the information extraction system, the identification information specification means may compare (e.g. using Equation (1) or Equation (2)) a positive example element vector and a negative example element vector, and specify a constituent element having a large value in the positive example element vector as the positive example identification information and specify a constituent element having a large value in the negative example element vector as the negative example identification information, the positive example element vector storing, for each constituent element of sentences included in the positive example solution request sentence set, the number of occurrences of the constituent element in the positive example solution request sentence set, and the negative example element vector storing, for each constituent element of sentences included in the negative example solution request sentence set, the number of occurrences of the constituent element in the negative example solution request sentence set.

(6) In the information extraction system, the identification information specification means may exclude a constituent element relating to a word having a low co-occurrence frequency with the problem evoking expression in the positive example element vector, and exclude a constituent element relating to a word having a low co occurrence frequency with the problem evoking expression in the negative example element vector.

(7) In the information extraction system, solution request pattern creation means (e.g. realized by the solution request pattern creation unit 106) for applying a given problem evoking expression candidate to a predetermined template sentence so that the sentence makes sense to create the positive example solution request pattern and the negative example solution request pattern may be included.

(8) In the information extraction system, the solution request pattern creation means may switch the predetermined template sentence to which the problem evoking expression candidate is applied, based on a sentence structure of the problem evoking expression candidate.

The exemplary embodiments described above may be partly or wholly described in the following supplementary notes, though the present invention is not limited to the following.

(Supplementary Note 1)

An information extraction system for extracting identification information for identifying a problem evoking expression which is an expression evoking a problematic situation, the information extraction system including solution request sentence set acquisition means for acquiring, using a positive example solution request pattern representing a positive example of a sentence including the problem evoking expression and a negative example solution request pattern representing an opposite request to the positive example solution request, a sentence set matching the positive example solution request pattern and a sentence set matching the negative example solution request pattern from a corpus respectively as a positive example solution request sentence set and a negative example solution request sentence set, and storing parts, in the acquired positive example solution request sentence set and negative example solution request sentence set, that correspond to the problem evoking expression in the positive example solution request pattern and the negative example solution request pattern, in association with a positive example and a negative example; and identification information specification means for comparing, for each problem evoking expression, constituent elements of sentences included in the positive example solution request sentence set and the negative example solution request sentence set, and specifying a constituent element characterizing the positive example solution request sentence set and a constituent element characterizing the negative example solution request sentence set, respectively as positive example identification information for identifying a positive example of a sentence including the problem evoking expression and negative example identification information for identifying a negative example of a sentence including the problem evoking expression.

(Supplementary Note 2)

The information extraction system according to supplementary note 1, wherein the solution request sentence set acquisition means acquires the positive example solution request sentence set and the negative example solution request sentence set in association with the problem evoking expression, using the positive example solution request pattern representing a part corresponding to the problem evoking expression as a regular expression and the negative example solution request pattern representing the problem evoking expression as a regular expression (Supplementary Note 3)

The information extraction system according to supplementary note 1 or 2, wherein the solution request sentence set acquisition means acquires each sentence set according to a constraint that defines, for the problem evoking expression, at least one of: to be a predetermined word class; not to be a predetermined word class; to be a predetermined character string; and not to be a predetermined character string.

(Supplementary Note 4)

The information extraction system according to any one of supplementary notes 1 to 3, wherein the solution request sentence set acquisition means regards the positive example solution request sentence set and the negative example solution request sentence set as empty sets, in the case where the positive example solution request sentence set and the negative example solution request sentence set each include only a smaller number of sentences than a predetermined threshold.

(Supplementary Note 5)

The information extraction system according to any one of supplementary notes 1 to 4, wherein the identification information specification means compares a positive example element vector and a negative example element vector, and specifies a constituent element having a large value in the positive example element vector as the positive example identification information and specifies a constituent element having a large value in the negative example element vector as the negative example identification information, the positive example element vector storing, for each constituent element of sentences included in the positive example solution request sentence set, the number of occurrences of the constituent element in the positive example solution request sentence set, and the negative example element vector storing, for each constituent element of sentences included in the negative example solution request sentence set, the number of occurrences of the constituent element in the negative example solution request sentence set.

(Supplementary Note 6)

The information extraction system according to supplementary note 5, wherein the identification information specification means specifies a difference between the positive example element vector and the negative example element vector, as positive/negative identification information.

(Supplementary Note 7)

The information extraction system according to supplementary note 5 or 6, wherein the identification information specification means excludes a constituent element relating to a word having a low co-occurrence frequency with the problem evoking expression in the positive example element vector, and excludes a constituent element relating to a word having a low co-occurrence frequency with the problem evoking expression in the negative example element vector.

(Supplementary Note 8)

The information extraction system according to any one of supplementary notes 1 to 7, including training data extraction means for extracting positive example training data and negative example training data from the corpus, the positive example training data being a sentence that includes the problem evoking expression and partly or wholly includes the positive example identification information, and the negative example training data being a sentence that includes a candidate of the problem evoking expression and partly or wholly includes the negative example identification information.

(Supplementary Note 9)

The information extraction system according to supplementary note 8, wherein the training data extraction means sets, as a training data candidate, a problem evoking expression that matches in polarity the problem evoking expression included in the positive example solution request pattern and the negative example solution request pattern.

(Supplementary Note 10)

The information extraction system according to any one of supplementary notes 1 to 9, including solution request pattern creation means for applying a given problem evoking expression candidate to a predetermined template sentence so that the sentence makes sense, to create the positive example solution request pattern and the negative example solution request pattern.

(Supplementary Note 11)

The information extraction system according to supplementary note 10, wherein the solution request pattern creation means switches the predetermined template sentence to which the problem evoking expression candidate is applied, based on a sentence structure of the problem evoking expression candidate.

(Supplementary Note 12)

An information extraction device for extracting identification information for identifying a problem evoking expression which is an expression evoking a problematic situation, the information extraction device including: solution request sentence set acquisition means for acquiring, using a positive example solution request pattern representing a positive example of a sentence including the problem evoking expression and a negative example solution request pattern representing an opposite request to the positive example solution request, a sentence set matching the positive example solution request pattern and a sentence set matching the negative example solution request pattern from a corpus respectively as a positive example solution request sentence set and a negative example solution request sentence set, and storing parts, in the acquired positive example solution request sentence set and negative example solution request sentence set, that correspond to the problem evoking expression in the positive example solution request pattern and the negative example solution request pattern, in association with a positive example and a negative example; and identification information specification means for comparing, for each problem evoking expression, constituent elements of sentences included in the positive example solution request sentence set and the negative example solution request sentence set, and specifying a constituent element characterizing the positive example solution request sentence set and a constituent element characterizing the negative example solution request sentence set, respectively as positive example identification information for identifying a positive example of a sentence including the problem evoking expression and negative example identification information for identifying a negative example of a sentence including the problem evoking expression.

(Supplementary Note 13)

An information extraction method for extracting identification information for identifying a problem evoking expression which is an expression evoking a problematic situation, the information extraction method including: acquiring, using a positive example solution request pattern representing a positive example of a sentence including the problem evoking expression and a negative example solution request pattern representing an opposite request to the positive example solution request, a sentence set matching the positive example solution request pattern and a sentence set matching the negative example solution request pattern from a corpus respectively as a positive example solution request sentence set and a negative example solution request sentence set, and storing parts, in the acquired positive example solution request sentence set and negative example solution request sentence set, that correspond to the problem evoking expression in the positive example solution request pattern and the negative example solution request pattern, in association with a positive example and a negative example; and comparing, for each problem evoking expression, constituent elements of sentences included in the positive example solution request sentence set and the negative example solution request sentence set, and specifying a constituent element characterizing the positive example solution request sentence set and a constituent element characterizing the negative example solution request sentence set, respectively as positive example identification information for identifying a positive example of a sentence including the problem evoking expression and negative example identification information for identifying a negative example of a sentence including the problem evoking expression.

(Supplementary Note 14)

An information extraction program for causing a computer to execute: a solution request sentence set acquisition process of acquiring, using a positive example solution request pattern representing a positive example of a sentence including the problem evoking expression and a negative example solution request pattern representing an opposite request to the positive example solution request, a sentence set matching the positive example solution request pattern and a sentence set matching the negative example solution request pattern from a corpus respectively as a positive example solution request sentence set and a negative example solution request sentence set, and storing parts, in the acquired positive example solution request sentence set and negative example solution request sentence set, that correspond to the problem evoking expression in the positive example solution request pattern and the negative example solution request pattern, in association with a positive example and a negative example; and an identification information specification process of comparing, for each problem evoking expression, constituent elements of sentences included in the positive example solution request sentence set and the negative example solution request sentence set, and specifying a constituent element characterizing the positive example solution request sentence set and a constituent element characterizing the negative example solution request sentence set, respectively as positive example identification information for identifying a positive example of a sentence including the problem evoking expression and negative example identification information for identifying a negative example of a sentence including the problem evoking expression.

Though the present invention has been described with reference to the above exemplary embodiments and examples, the present invention is not limited to the above exemplary embodiments and examples. Various changes understandable by those skilled in the art within the scope of the present invention can be made to the structures and details of the present invention.

This application claims priority based on Japanese Patent Application No. 2010-118450 filed on May 24, 2010, the disclosure of which is incorporated herein in its entirety.

INDUSTRIAL APPLICABILITY

The present invention is applicable for use in extracting a problem evoking expression and identification information for identifying whether or not the problem evoking expression actually represents a problem.

REFERENCE SIGNS LIST 1 information extraction device
2 CPU
3 memory
4 HDD
5 communication IF
6 input device
7 output device
8 bus
10 solution request sentence set acquisition means
20 identification information specification means
30 positive example solution request pattern storage unit
35 negative example solution request pattern storage unit
40 corpus storage unit
50 training data storage unit
60 other corpus storage unit
70 problem evoking expression storage unit
101 solution request sentence set acquisition unit
102 identification information specification unit
103 output unit
104 training data extraction unit
105 problem expression extraction unit
106 solution request pattern creation unit

The invention claimed is:

1. An information extraction system for extracting identification information for identifying a problem evoking expression which is an expression evoking a problematic situation, the information extraction system comprising:
   hardware including a processor;
   a solution request sentence set acquisition unit implemented at least by the hardware and for acquiring, a sentence set matching a positive example solution request pattern representing a positive example of a sentence including the problem evoking expression as a positive example solution request sentence set, from a corpus, and a sentence set matching a negative example solution request pattern representing an opposite request to the positive example solution request as a negative example solution request sentence set, from the corpus, and extracting the problem evoking expression from a sentence in the positive example solution request sentence set and storing the sentence in association with the problem evoking expression, and extracting the problem evoking expression from a sentence in the negative example solution request sentence set and storing the sentence in association with the problem evoking expression; and
   an identification information specification unit implemented at least by the hardware and for comparing, for each problem evoking expression, constituent elements of sentences included in the positive example solution request sentence set and the negative example solution request sentence set, and specifying a constituent element characterizing the positive example solution request sentence set and a constituent element characterizing the negative example solution request sentence set, respectively as positive example identification information for identifying a positive example of a sentence including the problem evoking expression and negative example identification information for identifying a negative example of a sentence including the problem evoking expression.

2. The information extraction system according to claim 1, wherein the solution request sentence set acquisition unit implemented at least by the hardware acquires the positive example solution request sentence set and the negative example solution request sentence set in association with the problem evoking expression, using the positive example solution request pattern representing the problem evoking expression as a regular expression and the negative example solution request pattern representing the problem evoking expression as a regular expression.

3. The information extraction system according to claim 1, wherein the solution request sentence set acquisition unit implemented at least by the hardware acquires each sentence set according to a constraint that defines, for the problem evoking expression, at least one of: to be a predetermined word class; not to be a predetermined word class; to be a predetermined character string; and not to be a predetermined character string.

4. The information extraction system according to claim 1, wherein the solution request sentence set acquisition unit implemented at least by the hardware regards the positive example solution request sentence set and the negative example solution request sentence set as empty sets, in the case where the positive example solution request sentence set and the negative example solution request sentence set each include only a smaller number of sentences than a predetermined threshold.

5. The information extraction system according to claim 1, wherein the identification information specification unit implemented at least by the hardware compares a positive example element vector and a negative example element vector, and specifies a constituent element having a large value in the positive example element vector as the positive example identification information and specifies a constituent element having a large value in the negative example element vector as the negative example identification information, the positive example element vector storing, for each constituent element of sentences included in the positive example solution request sentence set, the number of occurrences of the constituent element in the positive example solution request sentence set, and the negative example element vector storing, for each constituent element of sentences included in the negative example solution request sentence set, the number of occurrences of the constituent element in the negative example solution request sentence set.

6. The information extraction system according to claim 5, wherein the identification information specification unit implemented at least by the hardware excludes a constituent element relating to a word having a low co-occurrence frequency with the problem evoking expression in the positive example element vector, and excludes a constituent element relating to a word having a low co-occurrence frequency with the problem evoking expression in the negative example element vector.

7. The information extraction system according to claim 1, comprising
a solution request pattern creation unit implemented at least by the hardware for applying a given problem evoking expression candidate to a predetermined template sentence so that the sentence makes sense, to create the positive example solution request pattern and the negative example solution request pattern.

8. The information extraction system according to claim 7, wherein the solution request pattern creation unit implemented at least by the hardware switches the predetermined template sentence to which the problem evoking expression candidate is applied, based on a sentence structure of the problem evoking expression candidate.

9. An information extraction method for extracting identification information for identifying a problem evoking expression which is an expression evoking a problematic situation, the information extraction method comprising:
acquiring, using a processor comprising hardware, a sentence set matching a positive example solution request pattern representing a positive example of a sentence including the problem evoking expression as a positive example solution request sentence set, from a corpus;
acquiring, using the processor comprising hardware, a sentence set matching a negative example solution request pattern representing an opposite request to the positive example solution request, as a negative example solution request sentence set, from the corpus;
extracting, using the processor comprising hardware, the problem evoking expression from a sentence in the positive example solution request sentence set and storing the sentence in association with the problem evoking expression;
extracting, using the processor comprising hardware, the problem evoking expression from a sentence in the negative example solution request sentence set and storing the sentence in association with the problem evoking expression;
comparing, using the processor comprising hardware, for each problem evoking expression, constituent elements of sentences included in the positive example solution request sentence set and the negative example solution request sentence set; and
specifying, using the processor comprising hardware, a constituent element characterizing the positive example solution request sentence set and a constituent element characterizing the negative example solution request sentence set, respectively as positive example identification information for identifying a positive example of a sentence including the problem evoking expression and negative example identification information for identifying a negative example of a sentence including the problem evoking expression.

10. A non-transitory computer readable information recording medium storing an information extraction program, when executed by a processor, performs a method for:
acquiring, a sentence set matching a positive example solution request pattern representing a positive example of a sentence including the problem evoking expression as a positive example solution request sentence set, from a corpus;
acquiring, a sentence set matching a negative example solution request pattern representing an opposite request to the positive example solution request, as a negative example solution request sentence set, from the corpus;
extracting the problem evoking expression from a sentence in the positive example solution request sentence set and storing the sentence in association with the problem evoking expression;
extracting the problem evoking expression from a sentence in the negative example solution request sentence set and storing the sentence in association with the problem evoking expression;
comparing, for each problem evoking expression, constituent elements of sentences included in the positive example solution request sentence set and the negative example solution request sentence set; and
specifying a constituent element characterizing the positive example solution request sentence set and a constituent element characterizing the negative example solution request sentence set, respectively as positive example identification information for identifying a positive example of a sentence including the problem evoking expression and negative example identification information for identifying a negative example of a sentence including the problem evoking expression.

* * * * *